(12) United States Patent
Chen et al.

(10) Patent No.: US 6,275,523 B1
(45) Date of Patent: Aug. 14, 2001

(54) IN-SERVICE MEASUREMENT OF TRANSMITTER NONLINEARITIES

(75) Inventors: Xiaofen Chen, West Linn; Linley F. Gumm, Beaverton; Thomas L. Kuntz, Portland, all of OR (US)

(73) Assignee: Textronic, Inc., Beaverton, OR (US)

( * ) Notice: Subject to any disclaimer, the term of this patent is extended or adjusted under 35 U.S.C. 154(b) by 0 days.

(21) Appl. No.: 09/185,417

(22) Filed: Nov. 3, 1998

(51) Int. Cl.[7] .............................. H04B 17/00; H04L 5/12
(52) U.S. Cl. .................................... 375/226; 375/261
(58) Field of Search .................................. 375/226, 316, 375/321, 130, 219, 300, 301, 320, 324, 350, 261, 298; 329/357; 455/47, 109, 3.2

(56) References Cited

U.S. PATENT DOCUMENTS

| | | | |
|---|---|---|---|
| 4,953,186 | * 8/1990 | Levy et al. ........................... | 375/371 |
| 4,985,900 | * 1/1991 | Rhind et al. ........................ | 375/130 |
| 5,581,575 | * 12/1996 | Zehavi et al. ...................... | 375/200 |
| 5,987,069 | * 11/1999 | Furukawa et al. ................. | 375/285 |

OTHER PUBLICATIONS

"VSB Modulation Used for Terrestrial and Cable Broadcasts" by Gary Sgrignoli, Wayne Bretl, Richard Citta, Zenith Electronics Corporation, Jun. 1995.

* cited by examiner

Primary Examiner—Chi Pham
Assistant Examiner—Khai Tran
(74) Attorney, Agent, or Firm—William K. Bucher

(57) ABSTRACT

A system for in-service nonlinearity measurements measures such nonlinearities by way of comparing received linear error-corrected unfiltered signal samples with re-generated reference signal samples to calculate magnitude and phase nonlinear error values. Linear distortion is removed from the received signal samples in order to truly characterize nonlinear behavior of the transmitter. The linear error-corrected received signal samples are generated without applying the receiver shaping filtering. Reference signal samples are re-generated from estimated transmitted symbols from the unfiltered linear error-corrected received signal samples. The transmitted symbols are estimated using a multi-region slicer which dynamically estimates constellation decision levels from the unfiltered signal samples. A weighted, least-square based polynomial regression is performed on magnitude and phase nonlinear error values to estimate magnitude and phase nonlinear error functions while suppressing the impact of other non-systematic distortions.

97 Claims, 10 Drawing Sheets

STATEMENT OF NON COMMUTATIVE OPERATION BETWEEN LINEAR AND NONLINEAR FUNCTIONS

PHASE ERROR VERSUS IDEAL SIGNAL MAGNITUDE

US 6,275,523 B1

IN-SERVICE MEASUREMENT OF TRANSMITTER NONLINEARITIES

BACKGROUND OF THE INVENTION

The present invention relates generally to the measurement of transmitter parameters, and more particularly to a method and apparatus for in-service measurement of a transmitter's magnitude and phase nonlinearities.

Nonlinear magnitude and phase responses are common distortions caused by a transmitter power amplifier that affects the quality of a transmitted signal. The gain and phase responses of the amplifier are a function of the input signal magnitude to the amplifier, which can drive the amplifier into nonlinear operation. The distortion present in a received signal from the transmitter is often a mixture of linear distortion, nonlinear distortion, phase noise and additive noise. Correctly separating the nonlinear errors from the other distortions is desired for accurate measurement. However, with in-service measurement, the received signal is data bearing and its content is unknown to the measurement instrument.

In an 8 level Vestigial Side Band (8-VSB) digital modulation system, for example, the overall system response of the combined transmitter and receiver corresponds to a raised cosine filter to avoid system generated intersymbol interference. The system response is implemented with nominally identical root raised cosine filters in the transmitter and in the receiver. The information bearing digital data stream is randomized for spectrum spreading over the bandwidth of the frequency channel. The randomized data is forward-error-corrected (FEC) coded and interleaved. The data is trellis encoded as an 8-level (3-bit) one dimensional constellation with the outputs of the trellis coder referred to as symbols that are one of eight symmetric odd-valued integer levels from −7 to +7 units. To aid synchronization in low signal to noise and/or high multipath situations, segment and field syncs are inserted in the 10.76 Msymbols/sec symbol stream as well as a small pilot tone at the carrier frequency generated by offsetting the real or I channel of the complex signal containing the data and the sync pulses by 1.25 units. At the transmitter, the composite signal passes through a root raised cosine filter and modulates an intermediate frequency carrier signal which is up-converted to an RF frequency for transmission at the desired channel frequency. The offset causes the pilot tone to be in-phase with the I channel carrier frequency. Alternately, the composite signal may directly modulate the RF carrier.

Synchronous demodulation may be used to detect the eight constellation decision levels. However, the constellation of the transmitted symbols may bend or stretch to form certain curvatures due to the nonlinear distortions in the transmitter. Therefore, for estimation of constellation decision levels, a conventional slicing method is inadequate for symbol decision in the presence of large nonlinear distortions. For measurement purposes, attempting to determine an ideally transmitted signal from the received signal with large transmitter phase and/or magnitude nonlinearity would not be reliable using the conventional slicing method.

Also, conventional methods of measuring transmitter nonlinearity that apply the band-limiting transmission system's receiver filter to the received intermediate frequency (IF) signal would alter the characteristics of the nonlinear distortions. Nonlinear and linear transfer functions are usually not commutative, as stated in FIG. 1. That means the nonlinear function observed from the demodulated baseband signal (with the use of the transmission system's receiver filter) is different from the original nonlinear function of the power amplifier. It is difficult to derive the original nonlinear function from what is observed from the demodulated baseband signal, especially with a randomized digital signal. Also, strong nonlinearity causes signal spectrum spreading. The transmission system's receiver filter will significantly attenuate the out-of-band portion of the spread spectrum signal with the loss of spectral information characterized by the nonlinear distortions.

To determine the causes of poor signal quality of the transmitted signal and to provide pre-correction characteristics for the transmitter, accurate measurement of transmitter nonlinearities is very useful. However, the transmitter nonlinearities in the received signal are often combined with other distortions, such as linear distortions, carrier phase jitter, and additive noise. Due to the difficulty of separating various errors, nonlinearity is traditionally measured in an out-of-service mode. An out-of-service mode requires turning off the broadcast channel(s) (i.e. removing the modulations), which causes the loss of nonlinearity characteristics caused by the presence of the digital signal as well as other distortions.

What is needed is a method and apparatus for in-service measurement of transmitter magnitude and phase nonlinearities of a received signal, where the signal has a mixture of linear distortions, nonlinear distortions, phase noise and additive noise present, that uses reliable estimation of constellation decision levels and preserves original spectral information.

SUMMARY OF THE INVENTION

In accordance with the illustrated preferred embodiment of the invention, a system is disclosed which provides for in-service measurement of magnitude and phase nonlinearities of a modulated received signal that has a mixture of linear distortions, nonlinear distortions, phase noise and additive noise present, while using reliable estimation of constellation decision levels which preserves original spectral information.

In the preferred embodiment of the invention, the modulated received signal is an 8-VSB digital television signal having symbol data at 10.76 Msymbols/sec modulating a carrier signal. Prior to signal measurement, transmitter nonlinearities in a received signal are separated from linear distortions. This is performed by first demodulating the modulated received signal to baseband signal samples, filtering the signal samples with a transmission system receiver filter, time-aligning the signal samples to the symbol instances, scaling and linearly equalizing the signal samples to produce filtered signal samples. The timing parameters, scaling factor, and equalization coefficients of that process are applied to the demodulated signal samples without applying the transmission system receiver filter to produce unfiltered signal samples. The signal samples representing the transmitted symbols, which may be other than 8-VSB, are then estimated for purposes of generating reference signal samples representative of transmitted symbols. This is performed by dynamically estimating constellation decision levels from either the filtered or unfiltered signal samples. Magnitude and phase nonlinearities are then measured by comparing the unfiltered signal samples with the locally generated reference signal samples. While doing so, nonlinear distortions are distinguished from other noise-like distortions by using the systematic nature of transmitter nonlinearities and the random nature of other distortions by computing a weighted, least-square based polynomial regression on the error data between the unfiltered signal samples and the reference signal samples.

The objects, advantages, and other novel features of the present invention are apparent from the following detailed description when read in conjunction with the appended claims and attached drawing.

DESCRIPTION OF THE PREFERRED EMBODIMENT

In the following detailed description numerous specific details are set forth in order to provide a thorough understanding of the present invention. However, it will be understood by those skilled in the art that the present invention may be practiced without these specific details. In other instances well known methods, procedures, components, and circuits have not been described in detail so as not to obscure the present invention.

Part of the description will be presented in terms of operations performed by a computer system, using terms such as data, values, signal samples, flags, numbers and the like, consistent with the manner commonly employed by those skilled in the art to convey the substance of their work to others skilled in the art. As is well understood by those skilled in the art, these quantities take the form of electrical, magnetic, or optical signals capable of being stored, transferred, combined and otherwise manipulated through mechanical and electrical components of the computer system; and the term computer system includes general purpose as well as special purpose data processing machines, systems, and the like, that are stand alone, adjunct or embedded.

Additionally, various operations will be described as multiple discrete steps in turn in a manner that is most helpful in understanding the present invention, however, the order of description should not be construed as to imply that these operations are necessarily order dependent, in particular, the order of their presentation.

The present invention will be described in relation to an 8-VSB digitally modulated RF signal. It is understood that other digitally modulated RF signals may be used with the present invention without departing from the scope of the appended claims. For example, the proposed European standard for terrestrial digital television broadcasting, DVB-T using an OFDM format, calls for generating multiple carriers over a frequency band with each carrier containing a piece of data. The receiver performs a Fourier Transform of the received signal to retrieve the data. Such a system is not required to have transmitter and receiver filters. An 8-VSB RF signal has data symbols that modulate the RF carrier at a symbol frequency at approximately 10.76 Msymbols/sec. Further, the invention is described using baseband filtered, unfiltered and reference signal samples that have been processed through linear equalization processes. The in-service measurement of transmitter nonlinearities of the present invention may also be implemented where a known training sequence is used for generating the reference signal samples or are provided as the reference signal samples. Also, the invention may be practiced using IF signal samples.

Figure 2:
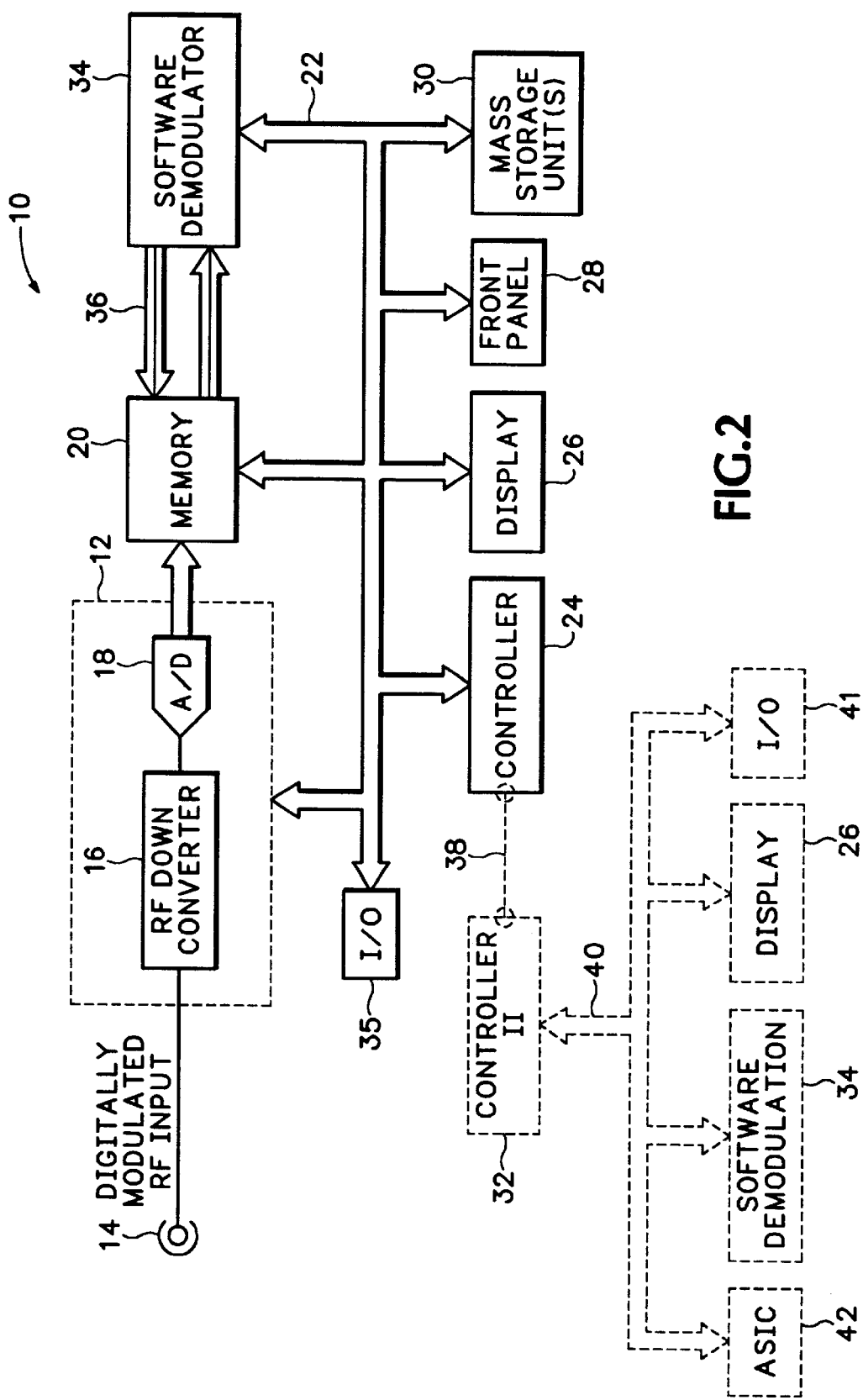
FIG. 2 is a block diagram illustrative of a transmission receiver system incorporating apparatus and method for in-service measurements of transmitter nonlinearities according to the present invention.

FIG. 2 shows a representative block diagram of a transmission system receiver 10, as could be used in a measurement instrument, digital television receiver or the like. The receiver 10 includes a hardware front end 12 receiving a digitally modulated RF input signal 14. The RF signal 14 is down converted to a digitally modulated intermediate frequency (IF) signal by RF hardware down converter circuitry 16 that generally includes one or more mixers in the IF signal path. Each mixer is driven by a local oscillator. An analog-to-digital (A/D) converter 18 receives the digitally modulated IF signal and converts the signal to digital data values that are stored in memory 20. In the preferred embodiment, the IF signal is sampled at four times the 8-VSB symbol frequency. Memory 20 includes both RAM, ROM and cache memory with the RAM memory storing volatile data, such as the data values representative of the IF signal and the like. A data and control bus 22 couples memory 20 to a controller 24, such as PENTIUM® microprocessor, manufactured and sold by Intel, Corp., Santa Clara, Calif. The data and control bus 22 may also be coupled to the front end hardware 12, a display device 26, such a liquid crystal display, cathode ray tube or the like, and a front panel 28 with buttons, rotatable knobs and the like and/or control entry devices, such as a keyboard and/or mouse. A mass storage unit or units 30, such as a hard disk drive, a CD ROM drive, a tape drive, a floppy drive or the like, that read from and/or write to appropriate mass storage media, may also be connected to the data and control bus 22. A software demodulator 34 is representatively shown connected to the bus 22 and coupled to memory 20. The software demodulator 34 executes various processes that are performed by the controller 24 using processing routines stored in memory 20 including program instructions performing the in-service measurement of transmitter nonlinearities. Data flow lines 36 connect the memory 20 with the software demodulator 34 for showing the movement of data from the memory 20 to the software demodulation process and back. The signal sample output from the various demodulator processes are stored in memory 20. The program instructions may be stored and accessed from the ROM memory 20 or from the mass storage media of the mass storage unit 30. The receiver 10 in the preferred embodiment of the invention is a PC based system controlled under WINDOWS® 95 operating system, manufactured and sold by Microsoft, Corp., Redmond, Wash. Graphical plotting software, such as PROESSENTIALS™ Graphic Display Software, manufactured and sold by Gigasoft, Inc. Keller Tex., is used for generating graphical representations of magnitude nonlinearity measurement of the present invention. The nonlinearity measurements may also be exported using an I/O device 35. The apparatus for performing the in-service nonlinearity measurements of the present invention may also be implemented using hardware circuitry performing the same functions as described for the software implementation. Alternately, a hybrid system using multiple controllers, such as controller 32 connected to controller 24 via a serial bus 38, may be used to implement the receiver 10 and the nonlinearity measurement functions of the present invention. The controller 32 is coupled to a separate data and control bus 40. Controller 32 may separately control display device 26 or perform a portion or portions of the software demodulator 34 functions. An I/O device 41 may be coupled to the control bus 40 for exporting the results of the software demodulator function or the nonlinearity measurements. Further the nonlinearity measurement functions may be implemented using both hardware circuitry, as represented by ASIC 42 and software routines performed by the controller 24 or controller 24 and 32.

Figure 3:
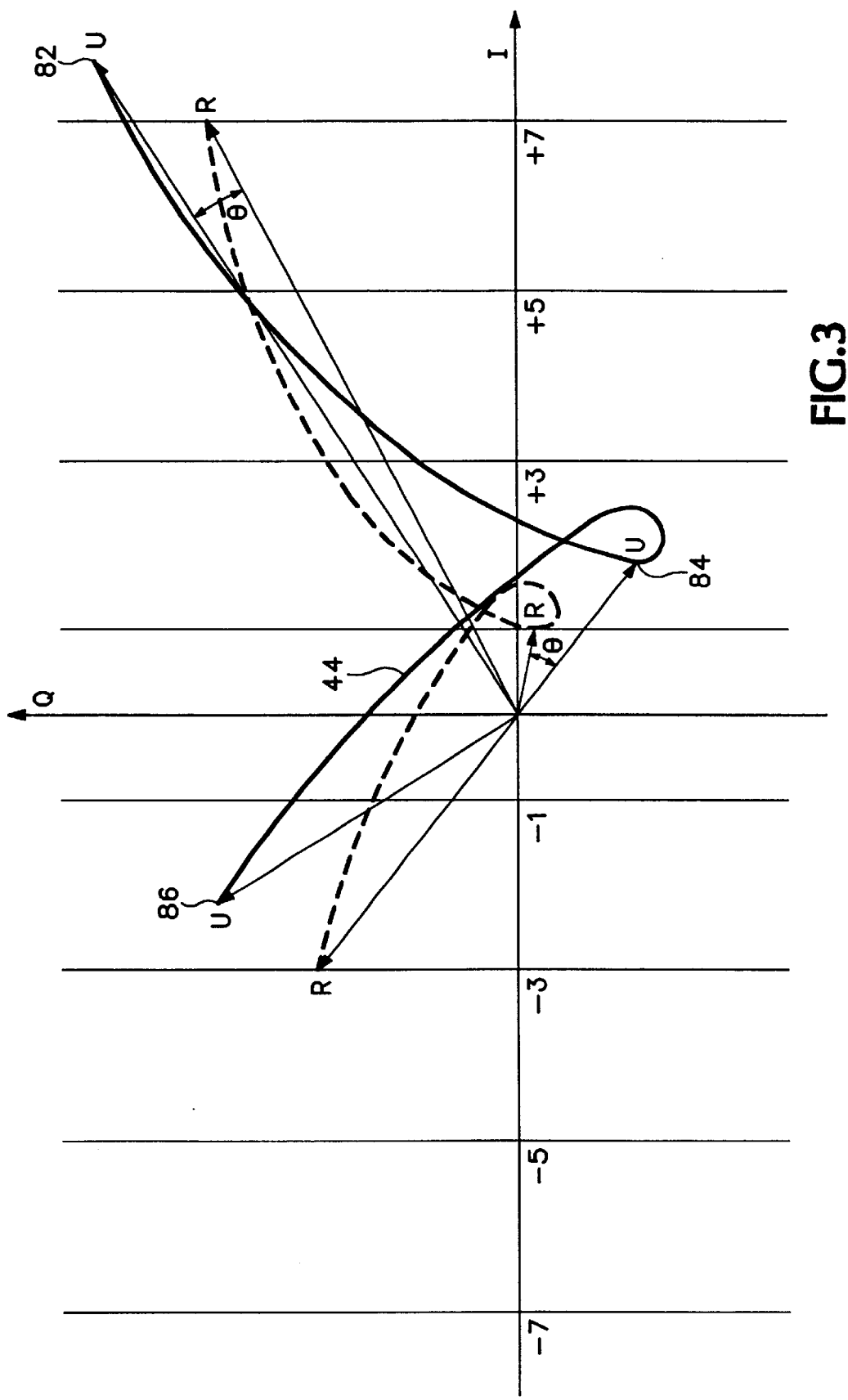
FIG. 3 is a representative constellation diagram of an 8-VSB signal showing actual and corresponding ideal vectors plus their trajectories over time for the purpose of understanding the apparatus and method for in-service measurements of transmitter nonlinearities according to the present invention.

Referring to FIG. 3, there is shown a polar plot of 8-VSB signal samples associated with lines representing a constellation diagram of 8-VSB signal samples. The figure will be used to describe some fundamental concepts of the 8-VSB system as well as some of the relationships affecting the nonlinearity measurements. The overall 8-VSB system response of the combined transmitter and receiver utilizes a raised cosine filter to create samples free of system generated inter-symbol interference at symbol times. The system response is implemented with nominally identical root raised cosine filters in the transmitter and in the receiver. The overall impulse response of the 8-VSB system is so constructed that ideally there would be no inter-symbol interference in the in-phase components which would result in 8 distinct vertical lines in the constellation diagram, and that the imaginary part of the response is combined with real part of the spectrum to suppress the unwanted sideband spectrum. Ideally, the real components are landing along the 8 vertical lines of the constellation diagram. The complex 8-VSB symbol data may be visualized on the complex plane as a vector, rotating about the origin, moving from one symbol value to another. The in-phase (real) parts of the symbol data are grouped along the real (I) axis at the appropriate symbol value. The quadrature parts of the symbol data is required to suppress the unwanted sideband and to minimize intersymbol interference and provide smooth transitions between the symbols. This is represented in FIG. 3 by line 44 for received signal samples 82, 84, and 86 of transmitted data having nonlinear magnitude, phase errors and intersymbol interference for future reference.

Figure 4:
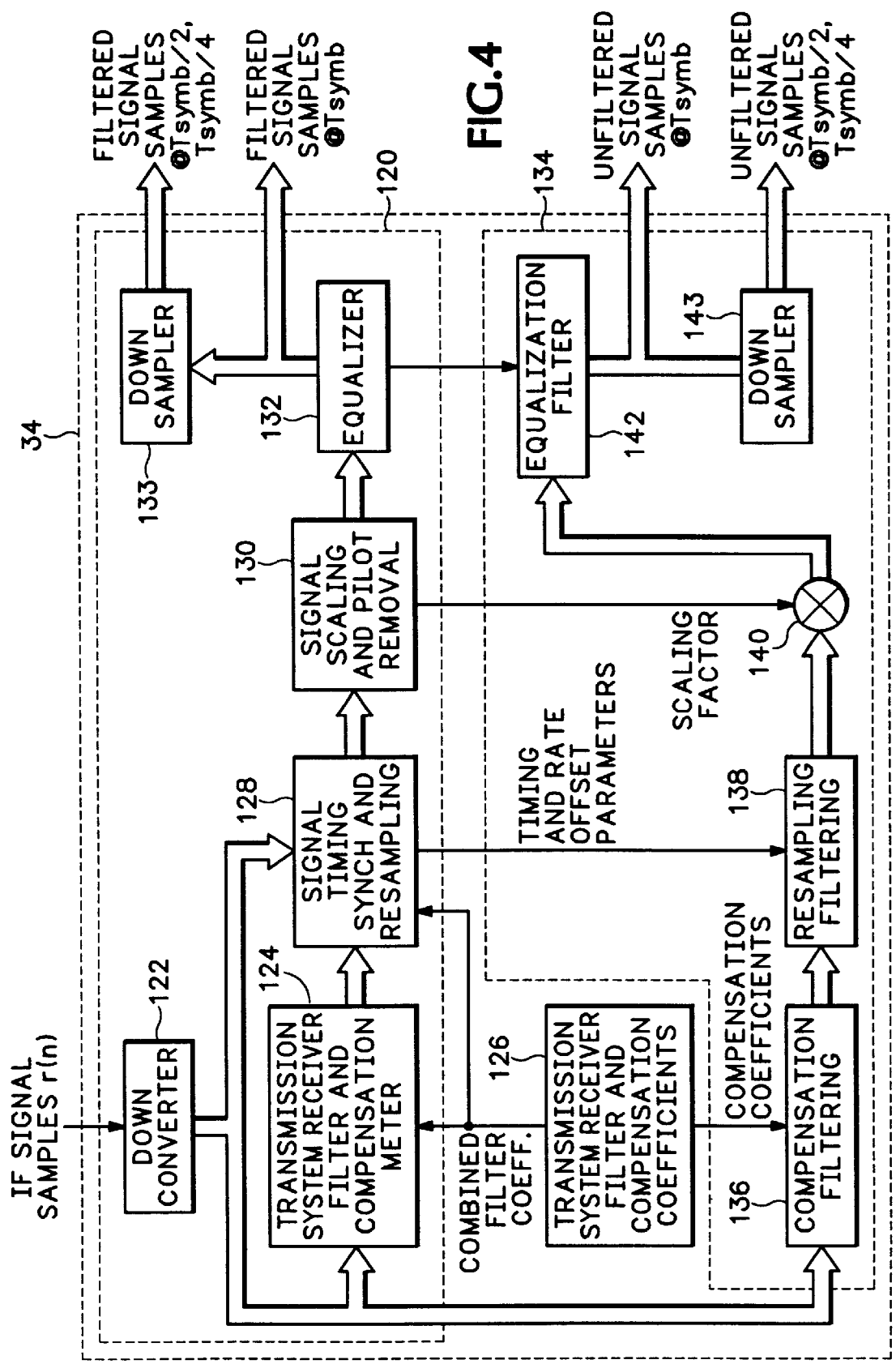
FIG. 4 is an improved demodulator used with the system for in-service measurement of transmitter nonlinearities according to the present invention.

The IF signal samples, stored in memory 20, are a record of 8-VSB IF data acquired at four times the 8-VSB symbol rate and denoted as r(n). The IF signal samples are demodulated to baseband signal samples by the improved demodulator 34, although the in-service nonlinearity measurement method disclosed herein could be applied to an IF signal as well. The baseband signal samples are time-aligned so every fourth sample falls at a symbol instance, scaled and linearly equalized by the improved demodulator 34, although equalization may not be necessary if no significant linear distortions are present. Referring to FIG. 4, the incoming IF signal is input to the improved demodulator 34 that first processes the signal samples in a first processing channel 120 to estimate the carrier phase, symbol timing frequency and phase offsets, gain factor, pilot amplitude, and equalizer coefficients. For the same IF record of data the demodulator 34 uses the carrier phase value to down convert 122 the IF signal to base band signal samples, which are stored in memory 20. The baseband signal samples in memory 20 are passed through a digital filter 124 having combined filter coefficients 126 producing a filter response of the transmission system receiver filter, which in the preferred embodiment is a root raised cosine filter, and compensation for linear distortions introduced by the hardware of the front end circuitry 12. A symbol timing synchronizer 128 estimates timing phase and rate offset parameters using the down converted signal samples and the combined filter coefficients 126 and applies the parameters to a resampling filter to time-align the filtered signal samples so that every fourth samples falls at a symbol instance. A signal scaling and pilot level remover 130 receives the filtered, time-aligned signal samples and determines a scaling factor and pilot level that are used to scale the filtered, time-aligned signal samples and remove the pilot level from the signal samples. An equalizer 132 receives the filtered, time-aligned, scaled signal samples and calculates equalizer coefficients that are applied to a equalization filter within the equalizer to produce filtered, time-aligned, scaled, equalized signal samples that are free of linear errors. The filtered, time-aligned, scaled, equalized signal samples from the first processing channel 120 are output from the demodulator 34 as filtered signal samples at four samples per 8-VSB symbol time (Tsymb/4). Alternatively, the filtered, time-aligned, scaled, equalized signal samples may be passed through a down sampler 133 to produce filtered signal samples at two samples per symbol time (Tsymb/2) or samples at symbol time (Tsymb).

Figure 1:
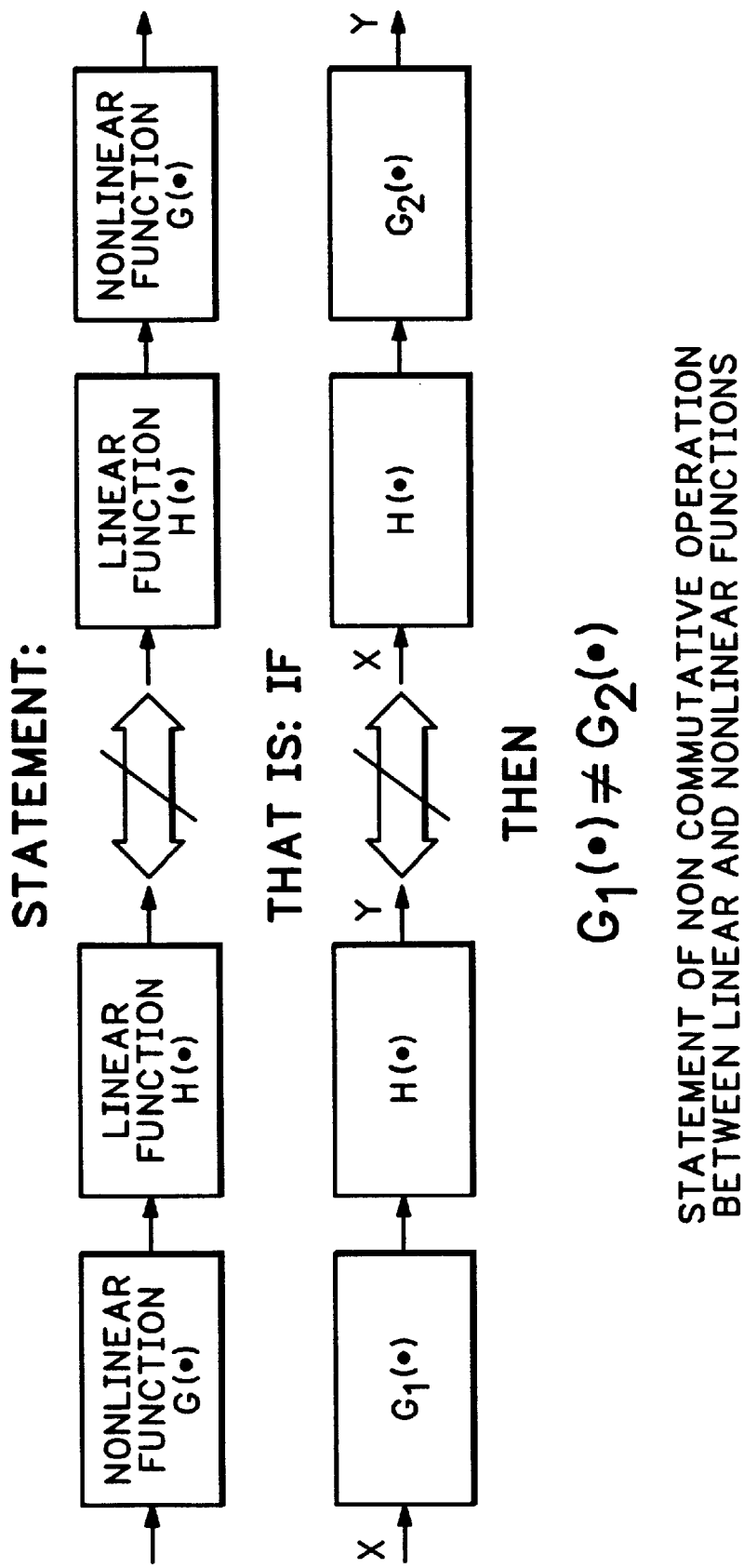
FIG. 1 is a diagram demonstrating the non-commutative operation between linear and non-linear functions.

The second processing channel 134 of the improved demodulator 34 receives the down converted baseband signal samples from memory 20. A compensation filter 136 receives the down converted signal samples and the coefficients that compensate for the linear distortion introduced by the front end hardware circuitry 12. The output of the compensation filter are compensated signal samples. A resampling filter 138 receives the compensated signal samples and the timing phase and rate offset parameters from the symbol timing synchronizer 128 and produces compensated signal samples time-aligned to the symbol frequency. A scaler 140 receives the compensated, time-aligned signal samples and the scaling factor from the pilot level estimator 130 and produces compensated, time-aligned, scaled signal samples. An equalization filter 142 receives the compensated, time-aligned, scaled signal samples and the equalizer coefficients from the equalizer 132 and produces compensated, time-aligned, scaled, equalized signal samples that are linear-error corrected. Note, the signal samples from the second processing channel 134 are demodulated and equalized without the transmission system's receiver filter 124. This is desirable due to the non-commutative operation between a linear function and a nonlinear function as illustrated in FIG. 1. The receiver filter 124 changes the spectrum of an in-band signal, which is the main body carrying the nonlinear behavior of a transmitter. Therefore, the nonlinear behavior of the transmitter estimated after the transmission system's receiver filter is different from that before the receiver filter, which is the true representation of transmitter nonlinearity. The compensated, time-aligned, scaled, equalized signal samples from the second processing channel 134 are output from the demodulator 34 as unfiltered signal samples at four samples per symbol time (Tsymb/4) with in-phase (I) and quadrature (Q) components denoted as $\{r_i(n), r_q(n)\}$. Alternatively, the compensated time-aligned, scaled, equalized signal samples may be passed through a down sampler 143 to produce unfiltered signal samples at two samples per symbol time (Tsymb/2) or samples at symbol time (Tsymb). The above described improved demodulator 34 is described in greater detail in co-pending patent application Ser. No. 09/185,419, filed Nov. 3, 1998.

Figure 5:
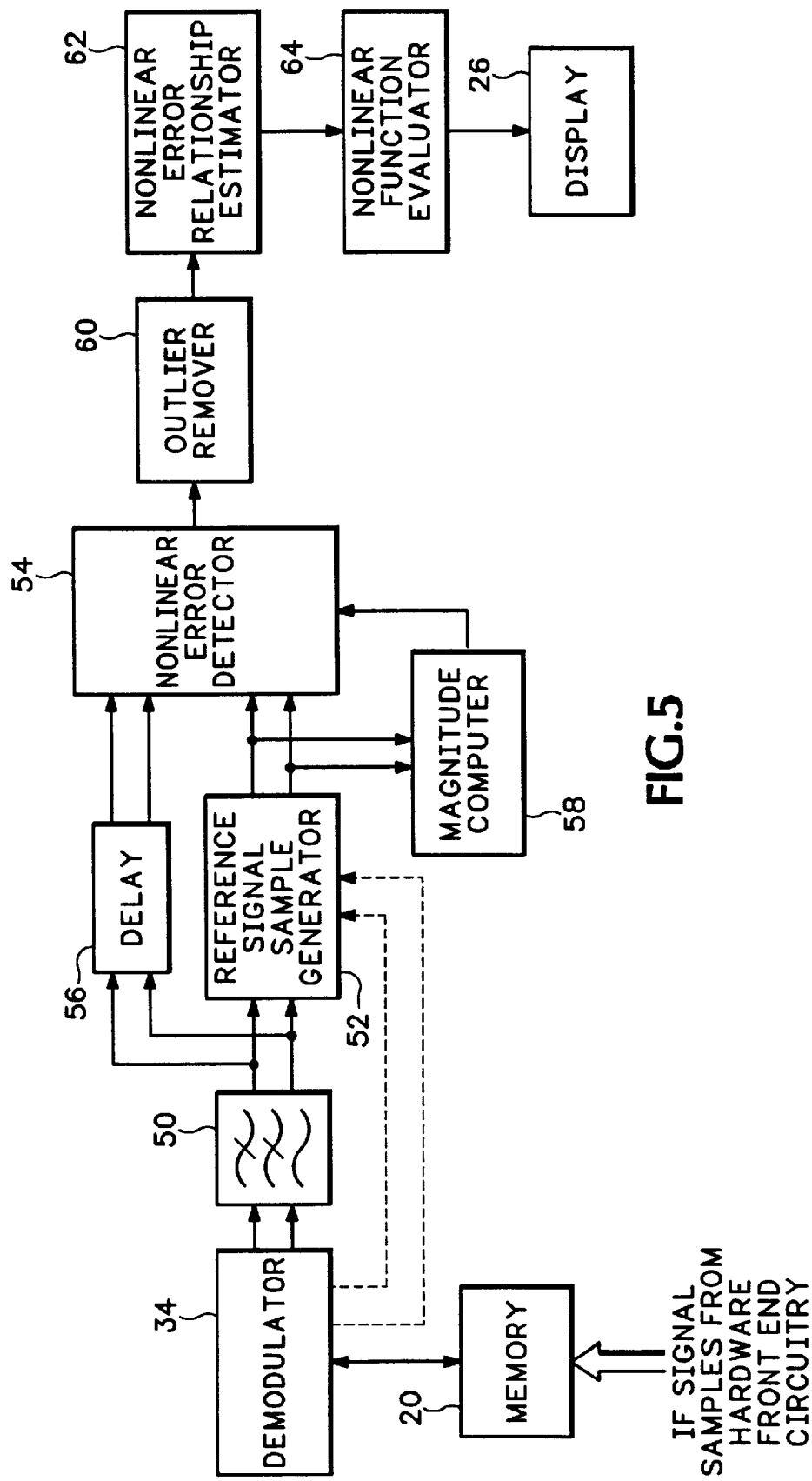
FIG. 5 is a block diagram of a system for in-service measurement of transmitter nonlinearities according to the present invention.

Referring to FIG. 5 there is shown a representative block diagram of a system incorporating the present invention for in-service measurement of transmitter nonlinearities. The demodulator 34 produces the filtered and unfiltered signal samples that are stored in memory 20. The filtered signal samples have been processed to include filtering through a transmission system receiver filter and the unfiltered signal samples have been processed without passing the samples through the transmission system receiver filter. The unfiltered signal samples, stored in memory 20, are input to a reference signal sample generator 52 via a low pass filter 50. The low pass filter 50, which has a flat amplitude and linear phase response across the signal band, assures the removal of the sum terms in the spectrum that are produced when down converting the IF signal samples to baseband. The unfiltered signal samples are also input to an nonlinear error detector 54 via a delay 56. The delay 56 provides time alignment of the unfiltered signal samples with reference signal samples produced by the reference signal sample generator 52. In an alternative implementation, the filtered signal samples from memory 20 are input to the reference signal sample generator 52 with the unfiltered signal samples being filtered by the low pass filter 50 and the coupled to the nonlinear error detector 54 via the delay 56. The reference signal sample generator 52 produces reference signal samples representing the estimated symbol values that were transmitted at the transmitter of the transmission system with the estimated symbol values in the same state as the signal samples at the output of lowpass filter 50. The reference signal samples are coupled to a magnitude computer 58 and to the nonlinear error detector 54. The magnitude computer 58 produces magnitude values M(n) of the reference signal samples. The reference magnitude values M(n) are coupled to the nonlinear error detector 54. The nonlinear error detector 54 is coupled to the outlier remover 60 which is in turn coupled to the nonlinear error relationship estimator 62. The nonlinear error relationship estimator 62 is coupled to the nonlinear function evaluator 64. The output of the nonlinear function evaluator 64 is coupled to the display 26.

Figure 6:
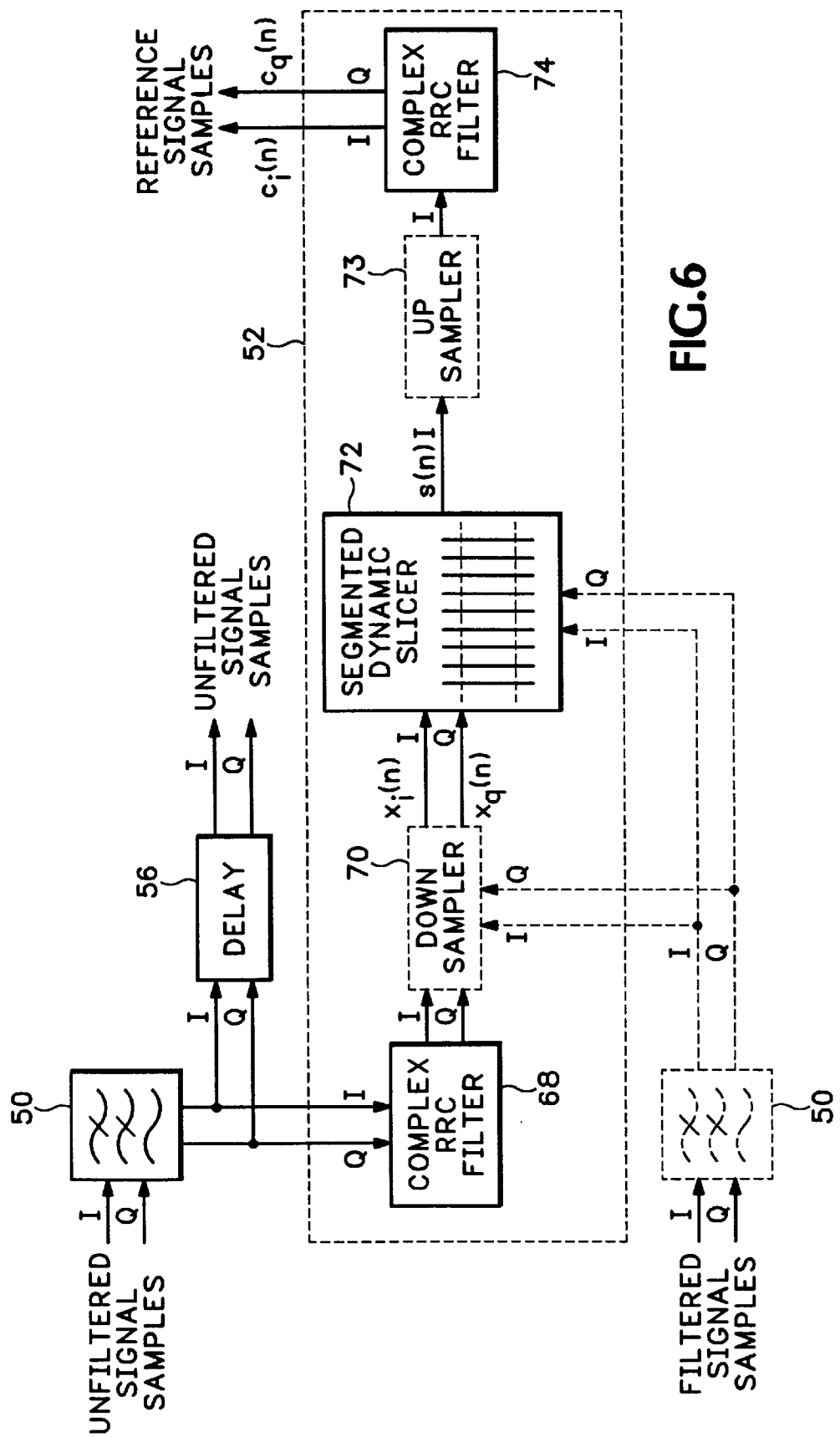
FIG. 6 is a block diagram of the improved reference signal generator in the system for in-service measurement of transmitter nonlinearities according to the present invention.
Figure 7:
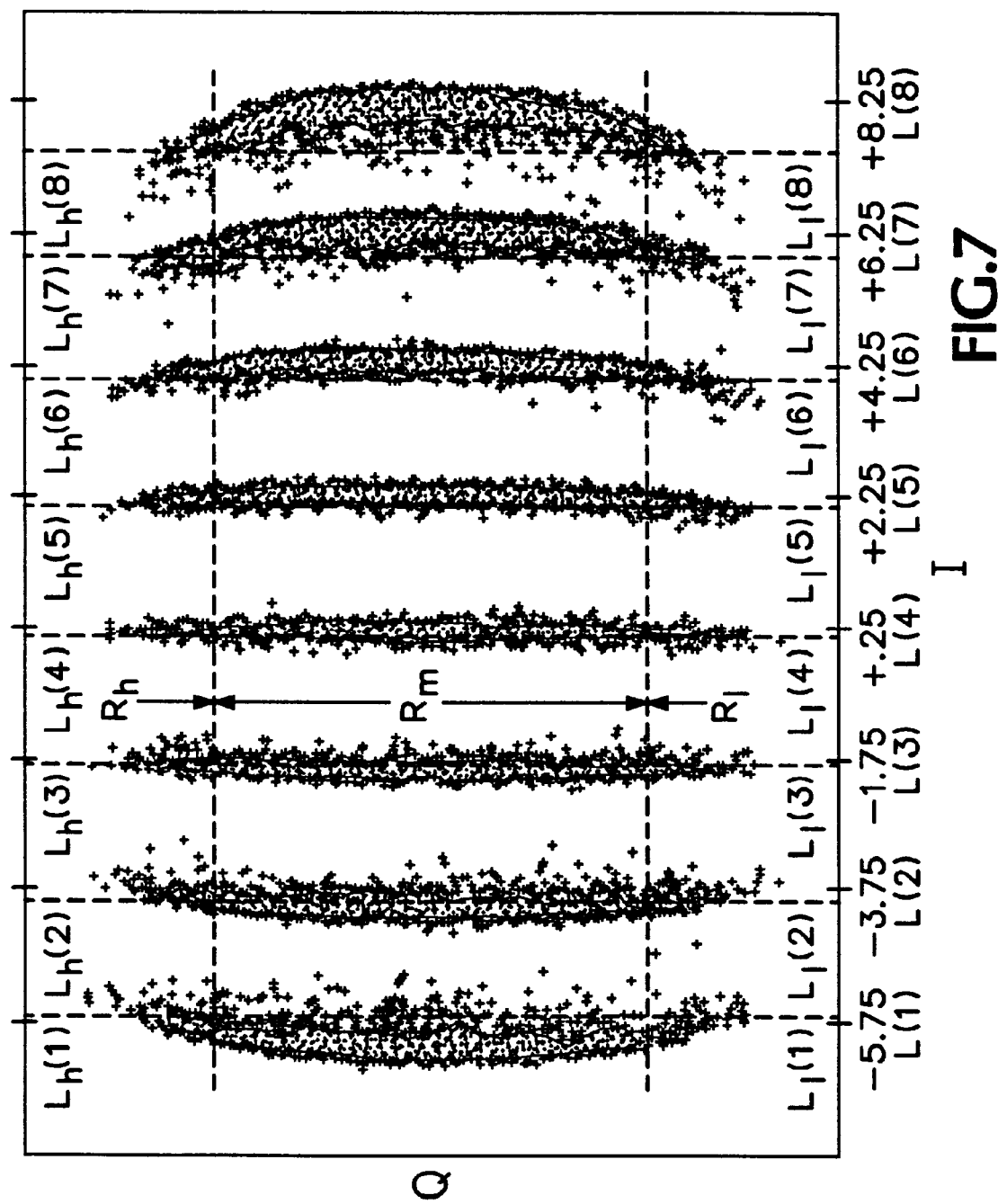
FIG. 7 is a graphical representation illustrating the implementation of the dynamic slicer the system for in-service measurement of transmitter nonlinearities according to the present invention.

The reference signal sample generator 52 is illustrated in greater detail in FIG. 6. In the preferred embodiment, the unfiltered signal samples from the demodulator 34 are coupled to the reference signal sample generator 52 via the low pass filter 50. The unfiltered signal samples are first filtered by the transmission system's receiver filter 68 (a complex root raised cosine (RRC) filter in the preferred embodiment) and down sampled to symbol times by down sampler 70 before a multi-region dynamic slicer 72 determines the transmitted symbols. The multi-region dynamic slicer 72 produces signal samples representing symbols denoted as $\{x_i(n), x_q(n)\}$ from the unfiltered signal samples that have passed through the RRC filter 68. The multi-region dynamic slicer 72 uses symbols $\{x_i(n), x_q(n)\}$ and slices on $x_i(n)$ to make decisions that estimate the transmitted symbols prior to modulating the transmitter carrier. Since large nonlinear distortion may cause constellation curvature, to perform an accurate symbol estimate, the constellation space having I and Q-dimensions is divided by the multi-region slicer 72 into several regions along the quadrature-dimension (Q-dimension) as shown in FIG. 7. Note that in the preferred embodiment where the unfiltered signal samples are applied to the multi-region slicer 72, the I-phase levels in the multi-region slicer 72 contain the 1.25 pilot level. In the embodiment where the filtered signal samples without the pilot level are applied to the slicer 72, the pilot level needs to be added back-in to generate reference signal samples corresponding to the unfiltered signal samples.

For each Q-dimension region $\{R_h, R_m, R_l\}$, I-dimension reference levels are dynamically estimated from the in-phase I-dimension samples. In the preferred embodiment, the constellation space is divided along the Q-dimension into 3 regions, $\{R_h, R_m, R_l\}$ as shown in the figure.

$$\{R_h | x_q(n) > [L(8)-L(1)]/2\} \quad (1)$$

$$\{R_m | -[L(8)-L(1)]/2 \leq x_q(n) \leq [L(8)-L(1)]/2\} \quad (2)$$

$$\{R_l | x_q(n) < -[L(8)-L(1)]/2\} \quad (3)$$

where $L(1), L(2), \ldots, L(8)$ are the ideal constellation levels along the I-dimension without the pilot level (Note: Equations 1, 2 & 3 assume the Q-channel gain is equal to the I-channel gain). From samples $\{x_i(n), x_q(n)\}$, the I-dimension constellation level sets $L_h(k)$, $L_m(k)$ and $L_l(k)$ ($k=1, 2, \ldots, 8$) are estimated. In the preferred embodiment of the invention, a Lloyd_Max quantizer is used for clustering the I-dimension values within each region to estimate I-dimension reference levels for each of the regions. The quantizer minimizes the mean square error for a given number of quantization levels or clusters M. For each region, the mean square clustering error is defined as follows:

$$\epsilon = E[(x - x^*)^2] \quad (4)$$

$$= \sum_{k=1}^{M} \int_{t(k)}^{t(k)+1} (x - L_x(k))^2 p_x(x) dx$$

where x is the I-dimension data with probability density function $p_x(x)$, $L_x(.)$'s are the cluster values to be estimated, and t(k) is the decision boundary between region k−1 and k. Setting the derivatives of $\epsilon$ with respect to t(k) and $L_x(k)$ to zero will give the optimal t(k) and $L_x(k)$.

$$\frac{\partial \epsilon}{\partial t(k)} = 0 \quad (5)$$

$$\frac{\partial \epsilon}{\partial L_x(k)} = 0$$

$$t(k) = \frac{(L_x(k) + L_x(k-1))}{2} \quad (6)$$

$$L_x(k) = \frac{\int_{t(k)}^{t(k+1)} x p_x(x) dx}{\int_{t(k)}^{t(k+1)} p_x(x) dx} \quad (7)$$

Equation (7) show that the optimal quantization level $L_x(k)$ in the decision region $[t(k), t(k+1)]$ is its conditional mean in that region.

In implementation, the optimal $L_x(k)$'s are searched using the following iterative clustering process:

Quantize $x_i(n)$ to A level (A>>M):

$$x(n) = \text{round}\left(\frac{x_i(n) - x_{\min}}{x_{\max} - x_{\min}}(A-1) + 1\right) \quad (8)$$

Approximate the probability density function of $x(n)$ by a normalized histogram, denoted as $p_x(k)$ ($k=1, \ldots, A$)

Initialize decision boundary levels $t(k+1)$ ($k=1, \ldots, M$) evenly across
A data levels $$L(k+1) = \text{round}\left(\frac{kA}{M}\right) + 1 \quad (9)$$

$$t(1) = 1$$

Calculate M clustering levels $L_x(k)$ according to equations (10) and (11) below $$L_x(k) = \frac{\sum_{i=t(k)}^{t(k+1)-1} i p_x(i)}{\sum_{i=t(k)}^{t(k+1)-1} p_x(i)} \quad (10)$$

$$t(k) = \frac{L_x(k) + L_x(k-1)}{2} k > 1 \quad (11)$$

$$t(1) = 1; \quad t(M+1) = A+1$$

$$\text{quantization error:} \; \epsilon(k) = \frac{\sum_{i=t(k)}^{t(k+1)-1} (i - L_x(k))^2 p_x(i)}{\sum_{i=t(k)}^{t(k+1)-1} p_x(i)} \quad (12)$$

If a particular region has no elements, i.e. $p_x(i)=0$ for $i=L(k)$ to $L(k+1)-1$, then merge this region to its adjacent region. At the end of one iteration (i.e., after $k=1$ to M), search for a region m which has the maximum quantization error $\epsilon(m)$ and insert an additional decision boundary level at $L_x(m)$.

Iterate two previous procedures for T times (e.g., T=5)

Restore the cluster levels $L_x(k)$'s to the original scale of data and calculate final quantization level $L_x(k)$ ($k=1, 2, \ldots, M$) as follows $$L_x(k) = E[x | (x - L_x(k))^2 < (x - L_x(j))^2, \forall j \neq k, 1 \leq j \leq M] \quad (13)$$

While the above described Lloyd_Max quantizer is implemented in the preferred embodiment of the invention, it is used as an example only. Other clustering methods and search schemes could be used without deviating from the concept of the segmented dynamic slicing.

The transmitted symbols denoted as $s(n)$ are estimated using a 3-region scheme in the following manner. For example, if $x_q(n) \in R_h$, $L_h(.)$ is used as the quantizing level set then the closest I-dimension cluster level $L_h(m)$ to $x_i(n)$ is found. The transmitted symbol is then determined as $s(n) = L(m)$. The same procedure applies for $x_q(n) \in R_m$ and $x_q(n) \in R_l$. The constellation space divided by the multi-region dynamic slicer 72 is used by example only and other constellation space dividing schemes may be used without departing from the scope of the invention as set forth in the appended claims.

A reference version of the transmitted signal denoted as $\{c_i(n), c_q(n)\}$ is then regenerated from the estimated transmitted symbols $s(n)$. The reference signal samples are regenerated for comparison by up-sampling the estimated transmitted symbols $s(n)$ to the unfiltered signal sample rate in up-sampler 73 and filtered using a transmission system transmitter filter 74 (an 8-VSB complex RRC filter in the preferred embodiment). The reference signal samples are input to the nonlinear error detector 54 and the magnitude computer 58.

Figure 8:
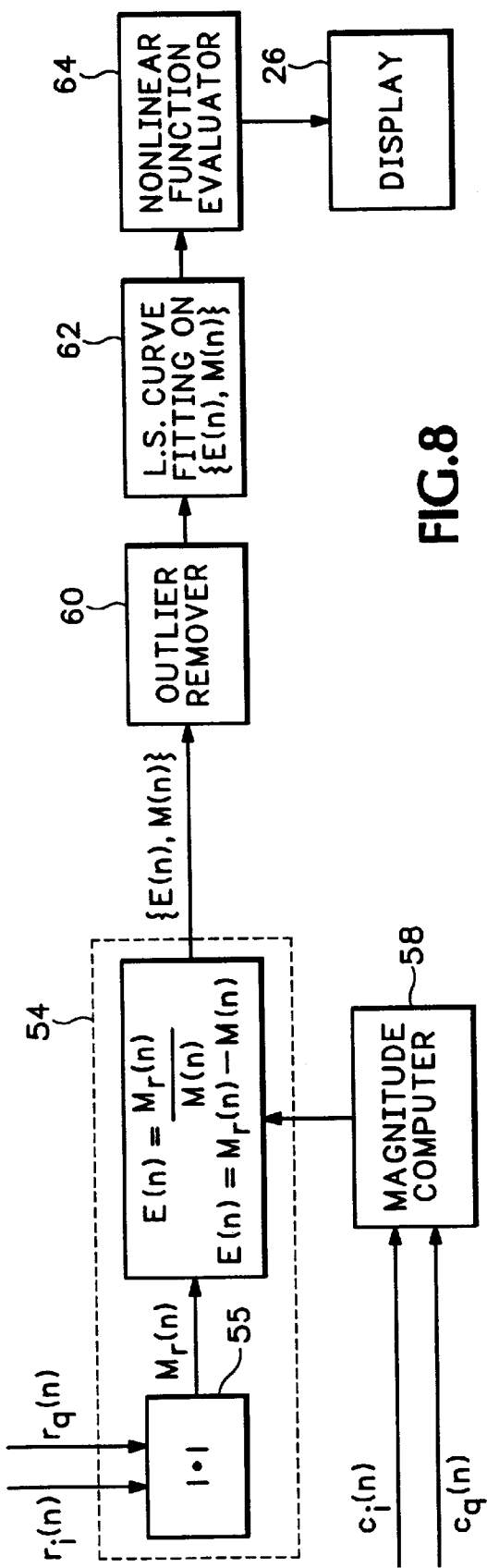
FIG. 8 is a more detailed block diagram of the system for measuring transmitter nonlinearities illustrating the measurement of transmitter magnitude nonlinearity according to the present invention.
Figure 9:
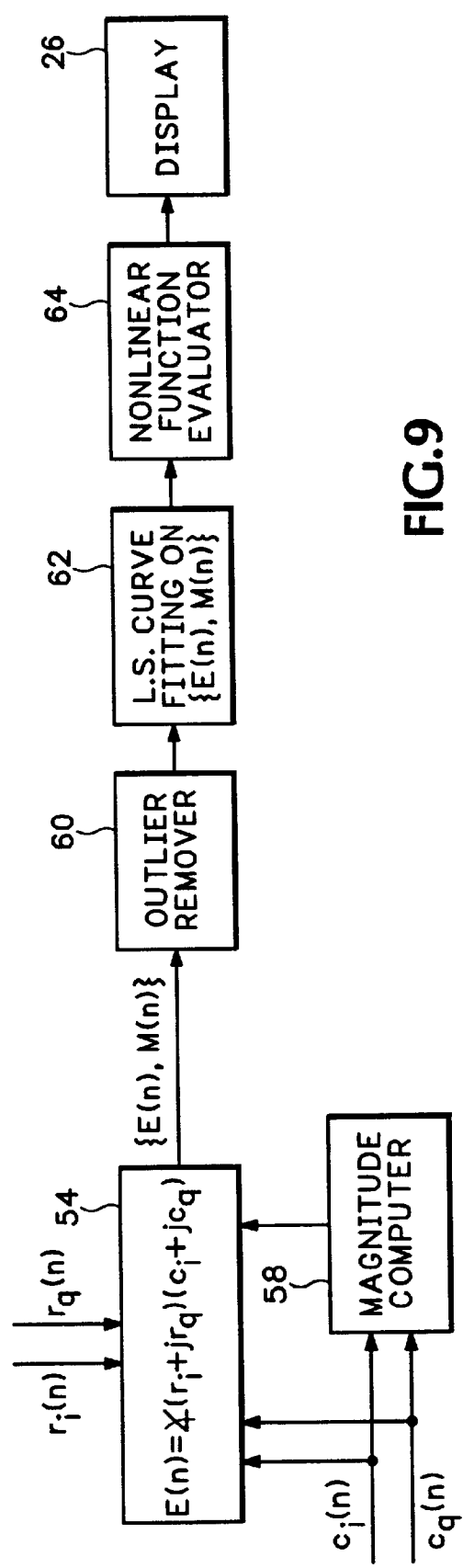
FIG. 9 is a more detailed block diagram of the system for measuring transmitter nonlinearities illustrating the measurement of transmitter phase nonlinearity according to the present invention.

Referring to FIGS. 8 and 9, the magnitude computer 58 generates reference magnitude values from the received reference signal samples. The reference magnitude values are provided to the nonlinear error detector 54. The nonlinear error detector 54 generates nonlinear error values representing the magnitude error, as shown in FIG. 8, or the phase error, as shown in FIG. 9. For magnitude error detection, magnitude values $M_r(n)$ of the unfiltered signal samples are generated as shown by block 55. There are two different ways of defining the magnitude error. One way is to define the magnitude error as the magnitude difference between reference magnitude values $M(n)$ and the unfiltered magnitude values $M_r(n)$ values:

$$\text{magnitude error:} \; E(n) = M_r(n) - M(n) \quad (14)$$

$$\text{where } M_r(n) = \sqrt{r_{i(n)}^2 + r_{q(n)}^2} \quad (15)$$

$$M(n) = \sqrt{c_{i(n)}^2 + c_{q(n)}^2} \quad (16)$$

The alternative definition, which is used in the preferred embodiment, defines the magnitude error as the ratio between the unfiltered magnitude values $M_r(n)$ and the reference magnitude values $M(n)$:

$$\text{magnitude error:} \; E(n) = \frac{M_r(n)}{M(n)} \quad (17)$$

For phase error detection, as shown in FIG. 9, the phase error is the phase difference between the reference vector $\{c_i(n), c_q(n)\}$ and the unfiltered vector $\{r_i(n), r_q(n)\}$ as represented below:

$$E(n) = \angle[r_i(n) + jr_q(n)][c_i(n) - jc_q(n)] \quad (18)$$

The nonlinear error detector 54 also arranges the error values as a function of the reference magnitude values.

Due to imperfect down conversion, reference signal generation error and additive noise in the system, even for small errors, samples with a small magnitude tend to have large errors and therefore large error variations, which affect the accuracy of the measurement. To overcome this problem, the following is performed by applying the nonlinear error values derived from the reference and unfiltered signal samples in the nonlinear error detector 54 to the outlier remover 60. The outlier remover 60 establishes boundaries or thresholds in nonlinear error versus magnitude space for removing nonlinear error values that affect the accuracy of the measurement. The signal magnitude range, derived from the reference signal samples, is divided into several subranges $R_M(k)$ (k=0, 1, ... K) in the outlier remover 60.

$$M_1 = \min_n \{M(n)\} \tag{19}$$

$$M_2 = \max_n \{M(n)\} \tag{20}$$

$$R_M(k) = M_1 + kM_2 - \frac{M_1}{K} \tag{21}$$

In each subrange, $R_M(k) \leq M(n) < R_M(k+1)$, those nonlinear error values having large deviations are dropped from the nonlinear function estimation. For small magnitude regions, (e.g. $k \leq K/3$), the decision boundary is determined based on a probability histogram and a prior p(k). As shown below, the boundary is determined so that within the boundary the data probability would be equal to p(k) and the probability density should be the largest in the subrange.

$$P(E_{low}(k) \leq E \leq E_{up}(k)) = p(k) \tag{22}$$

$$\{E_{low}(k), E_{up}(k)\} = \arg\max\left\{\frac{p(k)}{E_{up}(k) - E_{low}(k)}\right\}, \tag{23}$$

$$\forall E \in R_M(k)$$

The upper and lower boundaries are linearly interpolated between regions to have a smooth boundary contour.

While the above described histogram-based method is applicable for large magnitude regions, it proves to be computationally inefficient. The decision boundaries or thresholds for detecting outliers in the large magnitude regions may be implemented in the following manner for large magnitude regions. The decision boundaries are based on the mean and variance of the nonlinear error values in the respective large magnitude subranges.

mean of the error values in subrange k:

$$m_k = E[E(n)|R_M(k) \leq M(n) < R_M(k+1)] \tag{24}$$

variance of the error values in subrange k:

$$\sigma_k^2 = E[(E(n)-m_k)^2|R_M(k) \leq M(n) < R_M(k+1)] \tag{25}$$

k=0, 1, ... K-1

Threshold $TH_{k=\alpha\sigma k}$ e.g., $\alpha=1$ (26)

vector $\{E(i),M(i)\}=\{E(n),M(n)\}$ for $|E(n)-m_k| \leq TH_k$ (27)

Magnitude and phase nonlinearities are defined as a function of instantaneous signal magnitude. Therefore, to estimate a nonlinear function, the error set $\{E(n)\}$ is ordered as a function of signal magnitude M(n) in the nonlinear error relationship estimator 62 and a least square based (LS) polynomial curve fitting, although other regression methods may be used, is performed on the vector array $\{E(n), M(n)\}$. A polynomial curve fitting has the following form:

$$y=a_0+a_1x+a_2x^2+\ldots+a_Dx^D \tag{28}$$

where D is the polynomial order. A least square magnitude nonlinearity curve is then derived based on the following equations. Due to the fact that large nonlinear error often occur when the signal has a large magnitude, and the 8-VSB signal has a small probability of large magnitudes, a weighting function is applied to the LS curve fitting procedure to emphasize the large magnitude data pair. For example, for magnitude data greater than 0.75 ($L_{(8)}-L_{(1)}$), multiply both sides of the curve fitting function by a factor of 3. Also, to improve estimation accuracy, the reference magnitude values entering the least square curve fitting are shifted by a constant value to centerize the magnitude values (e.g., M(n)=M(n)−mean (M(n)).

$$E = MA \tag{29}$$

$$E = ([E(1), E(2), \ldots, E(N)])^T \tag{30}$$

$$A = ([a_0, a_1, a_2, \ldots, a_D])^T \tag{31}$$

$$M = \begin{bmatrix} 1 & M(1) & \cdots & M(1)^D \\ 1 & M(2) & \cdots & M(2)^D \\ \vdots & \vdots & \cdots & \vdots \\ 1 & M(N) & \cdots & M(N)^D \end{bmatrix} \tag{32}$$

$$A = (M^T M)^{-1} M^T E \tag{33}$$

From the estimated polynomial coefficients A, a smoothed polynomial function is derived over the range of signal magnitude.

$$E(M)=a_0+a_1M+\ldots+a_DM^D M \in \text{signal magnitude range} \tag{34}$$

For the magnitude errors as defined in equation (14), the gain of a transmitter amplifier, or nonlinear error values of the magnitude, is then calculated as a function of signal magnitude in the nonlinear function evaluator 64 from the following expression.

$$G_{dB}(M) = 20 \log_{10}\left(\frac{E(M)}{M} + 1\right) (dB) \tag{35}$$

For magnitude errors as defined in equation (17), the gain of the transmitter amplifier, or nonlinear error values of the magnitude, is then calculated as a function of signal magnitude in the nonlinear function evaluator 64 as:

$$G_{dB}(M) = 20 \log_{10} \frac{E(M)}{a_0} \tag{36}$$

For nonlinear phase errors, the nonlinear error values of the phase are given by equation 34 as:

$$\theta(M)=a_0+a_1M+\ldots+a_DM^D M \in \text{signal magnitude range} \tag{37}$$

Figure 10:
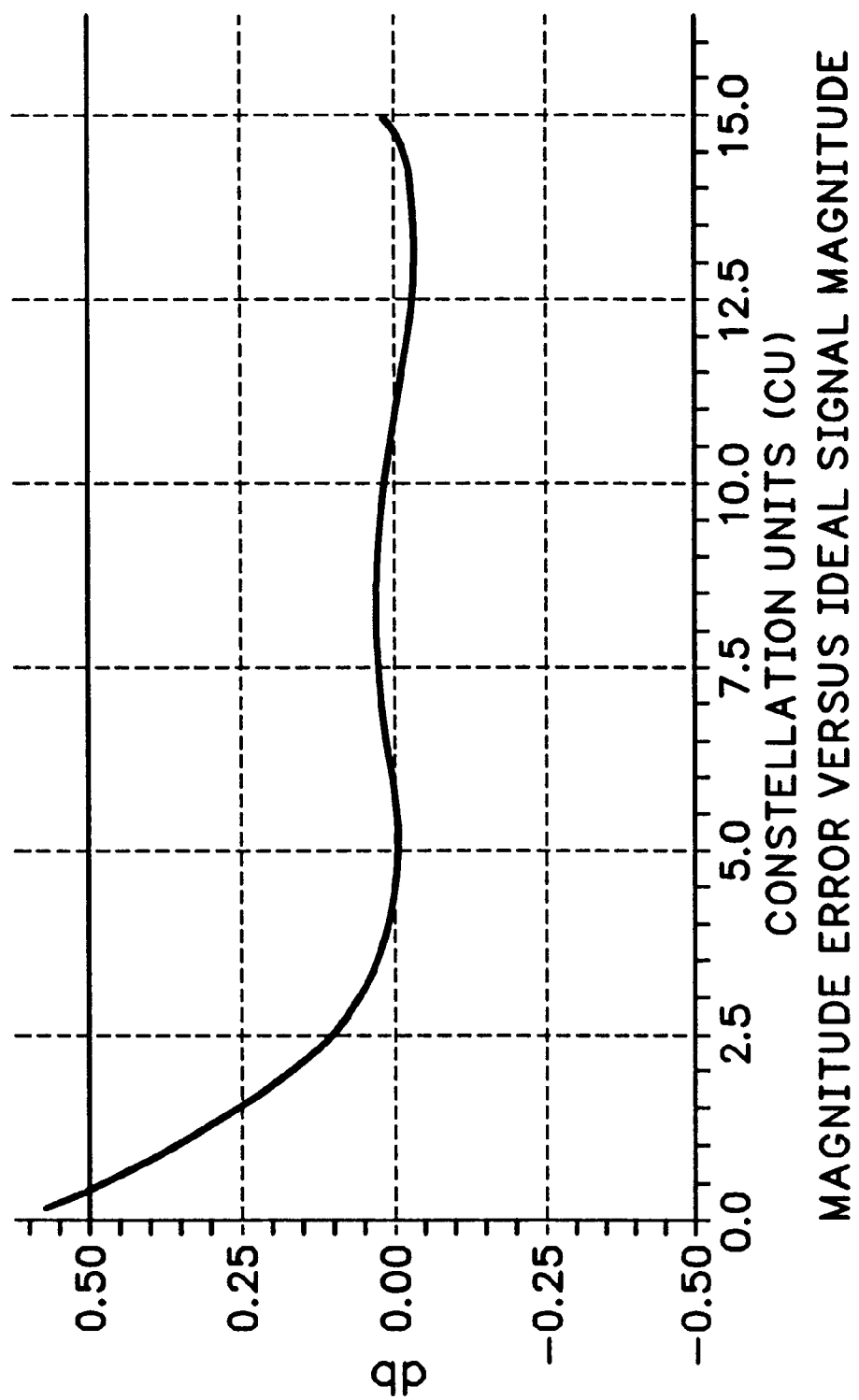
FIG. 10 is a representation of a graphic display of measurement results for magnitude nonlinear error.
Figure 11:
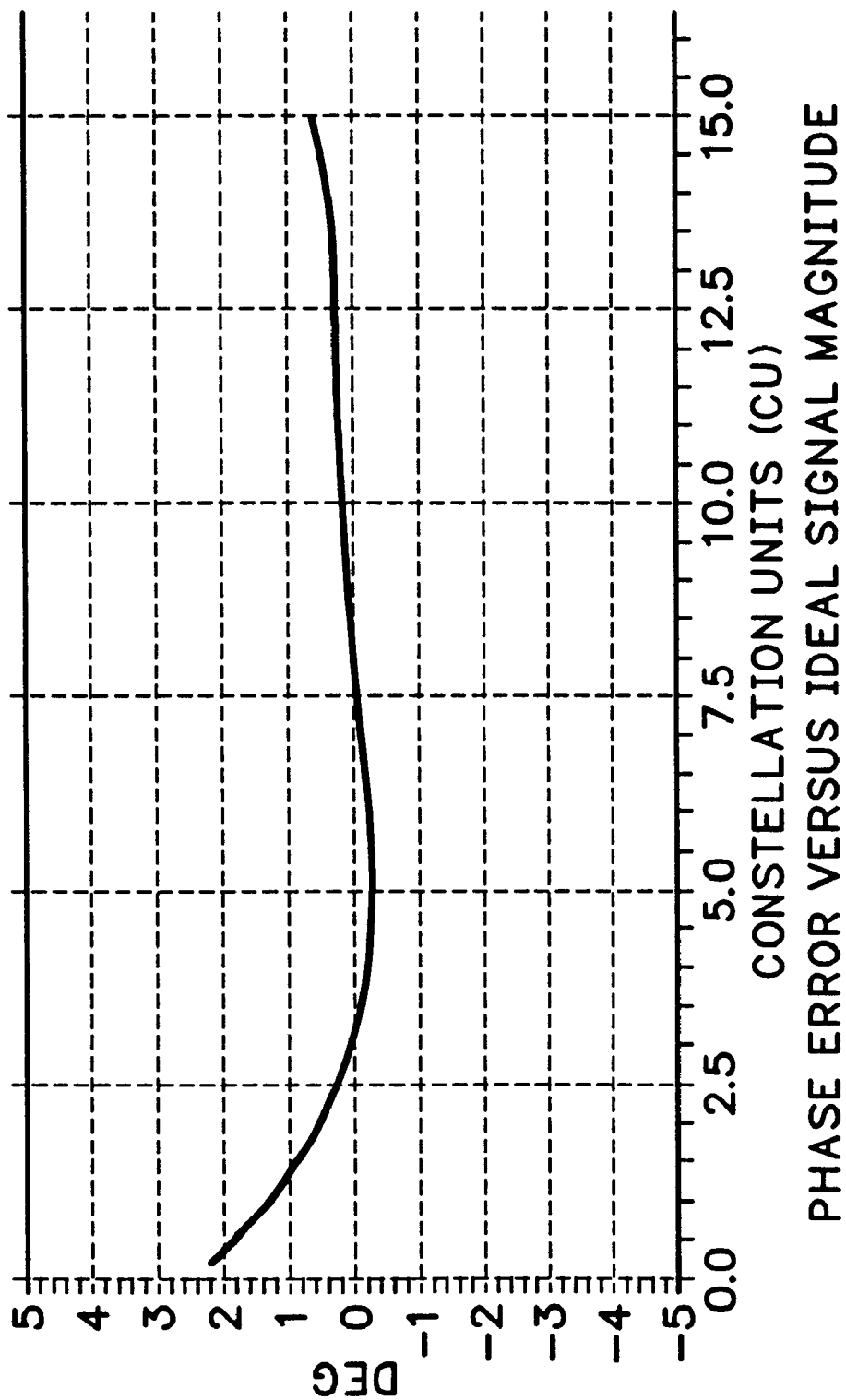
FIG. 11 is a representation of a graphic display of measurement results for phase nonlinear error.

FIGS. 10 and 11 respectively show representations of graphical displays of the nonlinear magnitude values versus a range of reference magnitude values and the nonlinear phase error values versus the range of reference magnitude values.

The above system for in-service measurements of transmitter nonlinearities has been described as a series of instruction executed by a processor of a transmission system receiver on signal samples stored in a memory. The elements and structure of the in-service transmitter nonlinearity measurement system and method of the present invention may equally be implemented using hardware circuitry. The elements of the system may implemented as discrete filters, logic circuits and delay lines. Alternatively, the elements may be implemented in one or more application specific integrated circuit (ASIC) device(s) or a combination or discrete circuit element and ASIC device(s).

A system for in-service transmitter nonlinearity measurements has been described that measures such nonlinearities by way of comparing generated reference signal samples to linear error-corrected unfiltered signal samples in order to measure the nonlinear error. Linear distortion is removed from the received signal samples and the linear error-corrected unfiltered signal samples are computed from the received signal samples without applying the transmission system's receiver filter. The reference signal samples are then estimated and regenerated from the unfiltered signal samples or filter signal samples where the transmission system's receiver filter is applied. No training sequence is required. A multi-region dynamic slicer accurately estimates the reference signal samples. In comparing the unfiltered signal samples with the reference signal samples, nonlinear distortions are distinguished from other noise-like distortions by utilizing the systematic nature of transmitter nonlinearity and the random nature of other distortions by computing a weighted, least-square based polynomial regression on the nonlinear error samples estimated from the comparison of the generated reference signal samples and the unfiltered signal samples.

What is claimed is:

1. A method for performing in-service nonlinear error measurements on a digitally modulated radio frequency signal wherein signal samples are generated representative of the received digitally modulated radio frequency signal and reference signal samples are generated from estimated transmitted digital symbols of the digital modulation that are time-aligned with the signal samples representative of the received signal, and magnitude values are calculated from the reference signal samples comprising the steps of:

a) generating nonlinear error values using the reference signal samples and the received signal samples;
   b) removing largely deviated nonlinear error values that exceed boundary values in error versus magnitude space;
   c) deriving coefficients for a nonlinear behavior function using the nonlinear error values within the boundary values; and
   d) estimating nonlinear error values as a function of the reference magnitude values using the derived coefficients in the nonlinear behavior function.

2. The method according to claim 1 wherein the generating nonlinear error values step further comprises the step of calculating magnitude nonlinear error values.

3. The method according to claim 1 wherein the generating nonlinear error values step further comprises the step of calculating phase nonlinear error values.

4. The method according to claim 1 wherein the removing largely deviated nonlinear error values step comprises the steps of:

a) dividing the nonlinear error values into subranges along the reference magnitude dimension;
   b) estimating mean and variance statistics of the nonlinear error values within each subrange,
   c) deriving boundary values based on the mean and variance of the nonlinear error values for each subrange; and
   d) discarding the nonlinear error values that lie outside the boundary values.

5. The method according to claim 1 wherein the removing largely deviated nonlinear error values step comprises the steps of:

a) dividing the nonlinear error values into subranges along the reference magnitude dimension;
   b) estimating the histogram and probability density of the nonlinear error values within each subrange;
   c) deriving boundary values based on the histogram and probability density of the nonlinear error values for each subrange; and
   d) discarding the nonlinear error values that lie outside the boundary values.

6. The method according to claim 1 wherein the coefficient deriving step further comprises the step of separating systematic nonlinear error values from random nonlinear error values by applying an optimal curve fitting on the nonlinear error values.

7. The method according to claim 6 further comprising the step of applying a weighting function to the nonlinear error values based on the probability distribution of the magnitude values of the transmitted digitally modulated signal samples.

8. The method according to claim 6 further comprising the step of shifting reference magnitude values entering the application of optimal curve fitting by a constant value resulting in a centerized reference magnitude values versus nonlinear error values thereby improving estimation accuracy.

9. A method for performing in-service nonlinear error measurements on a digitally modulated radio frequency signal generated by a transmission system having a transmitter filter and a receiver filter wherein signal samples are generated representative of the digitally modulated radio frequency signal and filtered signal samples are generated by filtering the signal samples through a transmission system receiver filter, unfiltered signal samples are generated by bypassing the transmission system receiver filter, reference signal samples are generated from estimated transmitted digital symbols of the digital modulation that are time-aligned with the unfiltered signal samples, and magnitude values are calculated from the reference signal samples comprising the steps of:

a) generating nonlinear error values using the reference signal samples and the unfiltered signal samples;
   b) removing largely deviated nonlinear error values that exceed boundary values in error versus magnitude space;
   c) deriving coefficients for a nonlinear behavior function using the nonlinear error values within the boundary values; and
   d) estimating nonlinear error values as a function of the reference magnitude values using the derived coefficients in the nonlinear behavior function.

10. The method according to claim 9 wherein the generating nonlinear error values step further comprises the step of calculating magnitude nonlinear error values.

11. The method according to claim 9 wherein the generating nonlinear error values step further comprises the step of calculating phase nonlinear error values.

12. The method according to claim 10 wherein the step of calculating magnitude nonlinear error values further comprises the steps of:

a) calculating unfiltered magnitude values from the unfiltered signal samples; and
   b) subtracting the reference magnitudes values from corresponding unfiltered magnitude values.

13. The method according to claim 10 wherein the step of calculating magnitude nonlinear error values further comprises the steps of:

a) calculating unfiltered magnitude values from the unfiltered signal samples; and
   b) calculating magnitude gain values by dividing the unfiltered magnitude values by the corresponding reference magnitudes values.

14. The method according to claim 13 wherein the step of calculating phase nonlinear error values further comprises the step of calculating the phase difference between the reference signal samples and the unfiltered signal samples.

15. The method according to claim 9 wherein the removing largely deviated nonlinear error values step comprises the steps of:
   a) dividing the nonlinear error values into subranges along the reference magnitude dimension;
   b) estimating mean and variance statistics of the nonlinear error values within each subrange;
   c) deriving boundary values based on the mean and variance of the nonlinear error values for each subrange; and
   d) discarding the nonlinear error values that lie outside the boundary values.

16. The method according to claim 9 wherein the removing largely deviated nonlinear error values step comprises the steps of:
   a) dividing the nonlinear error values into subranges along the reference magnitude dimension;
   b) estimating the histogram and probability density of the nonlinear error values within each subrange;
   c) deriving boundary values based on the histogram and probability density of the nonlinear error values for each subrange; and
   d) discarding the nonlinear error values that lie outside the boundary values.

17. The method according to claim 9 wherein the coefficient deriving step further comprises the step of separating systematic nonlinear error values from random nonlinear error values by applying an optimal curve fitting on the nonlinear error values.

18. The method according to claim 17 further comprising the step of applying a weighting function to the nonlinear error values based on the probability distribution of the magnitude values of the transmitted digitally modulated signal samples.

19. The method according to claim 17 further comprising the step of shifting reference magnitude values entering the application of optimal curve fitting by a constant value resulting in a centerized reference magnitude values versus nonlinear error values thereby improving estimation accuracy.

20. A method for performing in-service nonlinear error measurement on a digitally modulated radio frequency signal generated by a transmission system having a transmitter filter and a receiver filter wherein signal samples are generated representative of the digitally modulated radio frequency signal and filtered signal samples are generated by filtering the signal samples through a transmission system receiver filter and unfiltered signal samples are generated by bypassing the transmission system receiver filter comprising the steps of:
   a) generating reference signal samples from estimated transmitted digital symbols of the digital modulation using either the filtered or unfiltered signal samples;
   b) calculating magnitude values for the reference signal samples;
   c) time-aligning the unfiltered signal samples with the reference signal samples;
   d) generating nonlinear error values using the reference signal samples and the unfiltered signal samples;
   e) removing nonlinear error values that exceed boundary values in error versus magnitude space;
   f) deriving coefficients for a nonlinear behavior function using the nonlinear error values within the boundary values; and
   g) estimating nonlinear error values as a function of the reference magnitude values using the derived coefficients in the nonlinear behavior function.

21. The method according to claim 20 wherein the transmitted modulated data is digital symbols and the generating reference signal samples step comprises the steps of:
   a) estimating the transmitted digital symbols from the unfiltered signal samples; and
   b) regenerating the reference signal samples from the estimated symbols.

22. The method according to claim 21 wherein the estimating digital symbols step comprises the steps of:
   a) filtering the unfiltered signal samples using a transmission system receiver filter to obtain signal samples representing the received digital symbols;
   b) dividing constellation space having I and Q-dimensions into multiple regions along the Q-dimension;
   c) determining the constellation region of the received digital symbol using the Q-dimension value of the digital symbol;
   d) dynamically estimating I-dimension slicer decision levels for each region using the I-dimension values of the received digital symbols in the respective regions; and
   e) estimating the transmitted digital symbols by slicing the I-dimension values of the received digital symbols within each region against the slicer decision levels of that region.

23. The method according to claim 22 wherein the regenerating reference signal samples step comprises the step of filtering the estimated transmitted digital symbols using a transmission system transmitter filter to generate the reference signal samples.

24. The method according to claim 21 wherein the unfiltered signal samples are sampled at a rate greater than the symbol rate and the estimating transmitted digital symbols step comprises the steps of:
   a) filtering the unfiltered signal samples using a transmission system receiver filter to obtain signal samples that include the received digital symbols;
   b) down-sampling the filtered signal samples to obtain the received digital symbols;
   c) dividing constellation space having I and Q-dimensions into multiple regions along the Q-dimension;
   d) determining the constellation region of the received digital symbol using the Q-dimension value of the digital symbol;
   e) dynamically estimating I-dimension slicer decision levels for each region using the I-dimension values of the received digital symbols in the respective regions; and
   f) estimating the transmitted digital symbols by slicing the I-dimension values of the received digital symbols within each region against the slicer decision levels of that region.

25. The method according to claim 24 wherein the regenerating reference signal samples step comprises the steps of:
   a) up-sampling the estimated transmitted digital symbols to the same rate as the unfiltered signal samples; and
   b) filtering the up-sampled estimated transmitted symbols using a transmission system transmitter filter to generate the reference signal samples.

26. The method according to claim 20 wherein the transmitted modulated data is digital symbols and the generating reference signal samples step comprises the steps of:
   a) estimating the transmitted digital symbols from the filtered signal samples; and
   b) regenerating the reference signal samples from the estimated symbols.

27. The method according to claim 26 wherein filtered signal samples represent received digital symbols and the estimating transmitted digital symbols step comprises the steps of:
   a) dividing constellation space having I and Q-dimensions into multiple regions along the Q-dimension;
   b) determining the constellation region of the received digital symbol using the Q-dimension value of the digital symbol;
   c) dynamically estimating I-dimension slicer decision levels for each region using the I-dimension values of the received digital symbols in the respective regions; and
   d) estimating the transmitted digital symbols by slicing the I-dimension values of the received digital symbols within each region against the slicer decision levels of that region.

28. The method according to claim 26 wherein the regenerating reference signal samples step comprises the step of filtering the estimated transmitted digital symbols using a transmission system transmitter filter to generate the reference signal samples.

29. The method according to claim 26 wherein the filtered signal samples are sampled at a rate greater than the symbol rate and the estimating transmitted digital symbols step comprises the steps of:
   a) down-sampling the filtered signal samples to obtain the received digital symbols;
   b) dividing constellation space having I and Q-dimensions into multiple regions along the Q-dimension;
   c) determining the constellation region of the received digital symbol using the Q-dimension value of the digital symbol;
   d) dynamically estimating I-dimension slicer decision levels for each region using the I-dimension values of the received digital symbols in the respective regions; and
   e) estimating the transmitted digital symbols by slicing the I-dimension values of the received digital symbols within each region against the slicer decision levels of that region.

30. The method according to claim 29 wherein the regenerating reference signal samples step comprises the steps of:
   a) up-sampling the estimated transmitted digital symbols to the same rate as the filtered signal samples; and
   b) filtering the up-sampled estimated transmitted digital symbols using a transmission system transmitter filter to generate the reference signal samples.

31. The method according to claim 20 wherein the generating nonlinear error values step further comprises the step of calculating magnitude nonlinear error values.

32. The method according to claim 20 wherein the generating nonlinear error values step further comprises the step of calculating phase nonlinear error values.

33. The method according to claim 31 wherein the calculating magnitude nonlinear error values further comprises the steps of:
   a) calculating unfiltered magnitude values from the unfiltered signal samples; and
   b) subtracting the reference magnitudes values from corresponding unfiltered magnitude values.

34. The method according to claim 31 wherein the calculating magnitude nonlinear error values further comprises the steps of:
   a) calculating unfiltered magnitude values from the unfiltered signal samples; and
   b) calculating magnitude gain values by dividing the unfiltered magnitude values by the corresponding reference magnitudes values.

35. The method according to claim 32 wherein the calculating phase nonlinear error values further comprises the step of calculating the phase difference between the reference signal samples and the unfiltered signal samples.

36. The method according to claim 20 wherein the removing largely deviated nonlinear error values step comprises the steps of:
   a) dividing the nonlinear error values into subranges along the reference magnitude dimension;
   b) estimating mean and variance statistics of the nonlinear error values within each subrange;
   c) deriving boundary values based on the mean and variance of the nonlinear error values for each subrange; and
   d) discarding the nonlinear error values that lie outside the boundary values.

37. The method according to claim 20 wherein the removing largely deviated nonlinear error values step comprises the steps of:
   a) dividing the nonlinear error values into subranges along the reference magnitude dimension;
   b) estimating the histogram and probability density of the nonlinear error values within each subrange;
   c) deriving boundary values based on the histogram and probability density of the nonlinear error values for each subrange; and
   d) discarding the nonlinear error values that lie outside the boundary values.

38. The method according to claim 20 wherein the coefficient deriving step further comprises the step of separating systematic nonlinear error values from random nonlinear error values by applying an optimal curve fitting on the nonlinear error values.

39. The method according to claim 38 further comprising the step of applying a weighting function to the nonlinear error values based on the probability distribution of the magnitude values of the transmitted digitally modulated signal samples.

40. The method according to claim 38 further comprising the step of shifting reference magnitude values entering the application of optimal curve fitting by a constant value resulting in a centerized reference magnitude values versus nonlinear error values thereby improving estimation accuracy.

41. A method for performing in-service nonlinearity error measurements on a digitally modulated radio frequency signal generated by a transmission system having a transmitter filter and a receiver filter where the digitally modulated radio frequency signal is down converted to an intermediate frequency signal and digitized to produce intermediate frequency signal samples comprising the steps of:
   a) demodulating the intermediate frequency signal samples to filtered baseband signal samples using a transmission system receiver filter for filtering signal samples wherein the filtered demodulation process produces estimated carrier offsets values, timing phase and rate offset parameters, gain factor, pilot level estimation value, and equalizer coefficients;

b) down converting the intermediate frequency signal samples to baseband using the estimated carrier offset values;

c) resampling the down converted signal samples using the estimated timing phase and rate parameters;

d) applying the estimated gain factor to the resampled signal samples;

e) equalizing the resampled signal samples by using the estimated equalizer coefficients for generating unfiltered signal samples;

f) generating reference signal samples from estimated transmitted digital symbols of the digital modulation using either the filtered or unfiltered signal samples;

g) calculating magnitude values for the reference signal samples;

h) time-aligning the unfiltered signal samples with the reference signal samples;

j) generating nonlinear error values using the reference signal samples and the unfiltered signal samples;

k) removing nonlinear error values that exceed boundary values in error versus magnitude space;

l) deriving coefficients for a nonlinear behavior function using the nonlinear error values within the boundary values; and m) estimating nonlinear error values as a function of the reference magnitude values using the derived coefficients in the nonlinear behavior function.

42. The method according to claim 41 wherein the generating nonlinear error values step further comprises the step of calculating magnitude nonlinear error values.

43. The method according to claim 41 wherein the generating nonlinear error values step further comprises the step of calculating phase nonlinear error values.

44. The method according to claim 42 wherein the calculating magnitude nonlinear error values further comprises the steps of:

a) calculating unfiltered magnitude values from the unfiltered signal samples; and b) subtracting the reference magnitudes values from corresponding unfiltered magnitude values.

45. The method according to claim 42 wherein the calculating magnitude nonlinear error values further comprises the steps of:

a) calculating unfiltered magnitude values from the unfiltered signal samples; and b) calculating magnitude gain values by dividing the unfiltered magnitude values by the corresponding reference magnitudes values.

46. The method according to claim 43 wherein the calculating phase nonlinear error values further comprises the step of calculating the phase difference between the reference signal samples and the unfiltered signal samples.

47. The method according to claim 41 wherein the removing largely deviated nonlinear error values step comprises the steps of:

a) dividing the nonlinear error values into subranges along the reference magnitude dimension;

b) estimating mean and variance statistics of the nonlinear error values within each subrange;

c) deriving boundary values based on the mean and variance of the nonlinear error values for each subrange; and d) discarding the nonlinear error values that lie outside the boundary values.

48. The method according to claim 41 wherein the removing largely deviated nonlinear error values step comprises the steps of:

a) dividing the nonlinear error values into subranges along the reference magnitude dimension;

b) estimating the histogram and probability density of the nonlinear error values within each subrange;

c) deriving boundary values based on the histogram and probability density of the nonlinear error values for each subrange; and d) discarding the nonlinear error values that lie outside the boundary values.

49. The method according to claim 41 wherein the coefficient deriving step further comprises the step of separating systematic nonlinear error values from random nonlinear error values by applying an optimal curve fitting on the nonlinear error values.

50. The method according to claim 49 further comprising the step of applying a weighting function to the nonlinear error values based on the probability distribution of the magnitude values of the transmitted digitally modulated signal samples.

51. The method according to claim 49 further comprising the step of shifting reference magnitude values entering the application of optimal curve fitting by a constant value resulting in a centerized reference magnitude values versus nonlinear error values thereby improving estimation accuracy.

52. An apparatus for performing in-service nonlinear error measurements on a digitally modulated radio frequency signal wherein a measurement receiver generates signal samples representative of the received digitally modulated radio frequency signal with the receiver generating reference signal samples that represent estimated transmitted digital symbols of the digital modulation that are time-aligned with the received signal samples comprising:

means for generating nonlinear error values using the reference signal samples and the received signal samples;

means for removing largely deviated nonlinear error values that exceed boundary values in error versus magnitude space;

means for deriving coefficients for a nonlinear behavior function using the nonlinear error values within the boundary values; and means for estimating nonlinear error values as a function of the reference magnitude values using the derived coefficients in the nonlinear behavior function.

53. The apparatus according to claim 52 wherein the means for generating nonlinear error values further comprises a means for calculating magnitude nonlinear error values.

54. The apparatus according to claim 52 wherein the means for generating nonlinear error values further comprises a means for calculating phase nonlinear error values.

55. The apparatus according to claim 52 wherein the means for removing largely deviated nonlinear error values further comprises:

mean for dividing the nonlinear error values into subranges along the reference magnitude dimension;

means for estimating mean and variance statistics of the nonlinear error values within each subrange;

means for deriving boundary values based on the mean and variance of the nonlinear error values for each subrange; and means for discarding the nonlinear error values that lie outside the boundary values.

56. The apparatus according to claim 52 wherein the means for removing largely deviated nonlinear error values further comprises:
   means for dividing the nonlinear error values into subranges along the reference magnitude dimension;
   means for estimating the histogram and probability density of the nonlinear error values within each subrange;
   means for deriving boundary values based on the histogram and probability density of the nonlinear error values for each subrange; and
   means for discarding the nonlinear error values that lie outside the boundary values.

57. The apparatus according to claim 52 wherein the means for deriving coefficient further comprise means for separating systematic nonlinear error values from random nonlinear error values by applying an optimal curve fitting on the nonlinear error values.

58. The apparatus according to claim 57 further comprising means for applying a weighting function to the nonlinear error values based on the probability distribution of the magnitude values of the transmitted digitally modulated signal samples.

59. The apparatus according to claim 57 further comprising means for shifting reference magnitude values entering the application of optimal curve fitting by a constant value resulting in a centerized reference magnitude values versus nonlinear error values thereby improving estimation accuracy.

60. An apparatus for performing in-service nonlinear error measurements on a digitally modulated radio frequency signal generated by a transmission system having a transmitter filter and a receiver filter wherein a measurement receiver generates signal samples representative of the digitally modulated radio frequency signal that are processed to include filtering by a transmission system receiver filter to produce filtered signal samples and that are processed with the transmission system receiver filter being bypassed to produce unfiltered signal samples, with the receiver generating reference signal samples that represent estimated transmitted digital symbols of the digital modulation that are time-aligned with the unfiltered signal samples comprising:
   means for generating nonlinear error values using the reference signal samples and the unfiltered signal samples;
   means for removing largely deviated nonlinear error values that exceed boundary values in error versus magnitude space;
   means for deriving coefficients for a nonlinear behavior function using the nonlinear error values within the boundary values; and
   means for estimating nonlinear error values as a function of the reference magnitude values using the derived coefficients in the nonlinear behavior function.

61. The apparatus according to claim 60 wherein the means for generating nonlinear error values further comprises a means for calculating magnitude nonlinear error values.

62. The apparatus according to claim 60 wherein the means for generating nonlinear error values further comprises a means for calculating phase nonlinear error values.

63. The apparatus according to claim 61 wherein the means for calculating magnitude nonlinear error values further comprises:
   means for calculating unfiltered magnitude values from the unfiltered signal samples; and
   means for subtracting the reference magnitudes values from corresponding unfiltered magnitude values.

64. The apparatus according to claim 61 wherein the means for calculating magnitude nonlinear error values further comprises the steps of:
   means for calculating unfiltered magnitude values from the unfiltered signal samples; and
   means for calculating magnitude gain values by dividing the unfiltered magnitude values by the corresponding reference magnitudes values.

65. The apparatus according to claim 62 wherein the means for calculating phase nonlinear error values further comprises means for calculating the phase difference between the reference signal samples and the unfiltered signal samples.

66. The apparatus according to claim 60 wherein the means for removing largely deviated nonlinear error values further comprises:
   mean for dividing the nonlinear error values into subranges along the reference magnitude dimension;
   means for estimating mean and variance statistics of the nonlinear error values within each subrange;
   means for deriving boundary values based on the mean and variance of the nonlinear error values for each subrange; and
   means for discarding the nonlinear error values that lie outside the boundary values.

67. The apparatus according to claim 60 wherein the means for removing largely deviated nonlinear error values further comprises:
   means for dividing the nonlinear error values into subranges along the reference magnitude dimension;
   means for estimating the histogram and probability density of the nonlinear error values within each subrange;
   means for deriving boundary values based on the histogram and probability density of the nonlinear error values for each subrange; and
   means for discarding the nonlinear error values that lie outside the boundary values.

68. The apparatus according to claim 60 wherein the means for deriving coefficient further comprise means for separating systematic nonlinear error values from random nonlinear error values by applying an optimal curve fitting on the nonlinear error values.

69. The apparatus according to claim 68 further comprising means for applying a weighting function to the nonlinear error values based on the probability distribution of the magnitude values of the transmitted digitally modulated signal samples.

70. The apparatus according to claim 68 further comprising means for shifting reference magnitude values entering the application of optimal curve fitting by a constant value resulting in a centerized reference magnitude values versus nonlinear error values thereby improving estimation accuracy.

71. An apparatus for performing in-service nonlinear error measurements on a digitally modulated radio frequency signal generated by a transmission system having a transmitter filter and a receiver filter wherein a measurement receiver generates signal samples representative of the digitally modulated radio frequency signal that are processed to include filtering by a transmission system receiver filter to produce filtered signal samples and that are processed with the transmission system receiver filter being bypassed to produce unfiltered signal samples comprising:

means for generating reference signal samples from estimated transmitted digital symbols in the modulation data using either the filtered or unfiltered signal samples;

means for calculating magnitude values for the reference signal samples;

means for time-aligning the unfiltered signal samples with the reference signal samples;

means for generating nonlinear error values using the reference signal samples and the unfiltered signal samples;

means for removing nonlinear error values that exceed boundary values in error versus magnitude space;

means for deriving coefficients for a nonlinear behavior function using the nonlinear error values within the boundary values; and means for estimating nonlinear error values as a function of the reference magnitude values using the derived coefficients in the nonlinear behavior function.

72. The apparatus according to claim 71 wherein the transmitted modulated data is digital symbols and the means for generating reference signal samples comprises:

means for estimating the transmitted digital symbols from the unfiltered signal samples; and means for regenerating the reference signal samples from the estimated symbols.

73. The apparatus according to claim 72 wherein the means for estimating digital symbols comprises:

means for filtering the unfiltered signal samples using a transmission system receiver filter to obtain signal samples representing the received digital symbols;

means for dividing constellation space having I and Q-dimensions into multiple regions along the Q-dimension;

means for determining the constellation region of the received digital symbol using the Q-dimension value of the digital symbol;

means for dynamically estimating I-dimension slicer decision levels for each region using the I-dimension values of the received digital symbols in the respective regions; and means for estimating the transmitted digital symbols by slicing the I-dimension values of the received digital symbols within each region against the slicer decision levels of that region.

74. The apparatus according to claim 73 wherein the means for regenerating reference signal samples comprises mean for filtering the estimated transmitted digital symbols using a transmission system transmitter filter to generate the reference signal samples.

75. The apparatus according to claim 72 wherein the unfiltered signal samples are sampled at a rate greater than the symbol rate and the means for estimating transmitted digital symbols comprises:

means for filtering the unfiltered signal samples using a transmission system receiver filter to obtain signal samples that include the received digital symbols;

means for down-sampling the filtered signal samples to obtain the received digital symbols;

means for dividing constellation space having I and Q-dimensions into multiple regions along the Q-dimension;

means for determining the constellation region of the received digital symbol using the Q-dimension value of the digital symbol;

means for dynamically estimating I-dimension slicer decision levels for each region using the I-dimension values of the received digital symbols in the respective regions; and means for estimating the transmitted digital symbols by slicing the I-dimension values of the received digital symbols within each region against the slicer decision levels of that region.

76. The apparatus according to claim 75 wherein the means for regenerating reference signal samples comprises:

means for up-sampling the estimated transmitted digital symbols to the same rate as the unfiltered signal samples; and means for filtering the up-sampled estimated transmitted symbols using a transmission system transmitter filter to generate the reference signal samples.

77. The apparatus according to claim 71 wherein the means for generating nonlinear error values further comprises means for calculating magnitude nonlinear error values.

78. The apparatus according to claim 71 wherein the means for generating nonlinear error values further comprises means for calculating phase nonlinear error values.

79. The apparatus according to claim 77 wherein the means for calculating magnitude nonlinear error values further comprises:

means for calculating unfiltered magnitude values from the unfiltered signal samples; and means for subtracting the reference magnitudes values from corresponding unfiltered magnitude values.

80. The apparatus according to claim 77 wherein the means for calculating magnitude nonlinear error values further comprises:

means for calculating unfiltered magnitude values from the unfiltered signal samples; and means for calculating magnitude gain values by dividing the unfiltered magnitude values by the corresponding reference magnitudes values.

81. The apparatus according to claim 78 wherein the means for calculating phase nonlinear error values further comprises means for calculating the phase difference between the reference signal samples and the unfiltered signal samples.

82. The apparatus according to claim 71 wherein the means for removing largely deviated nonlinear error values comprises:

means for dividing the nonlinear error values into subranges along the reference magnitude dimension;

means for estimating mean and variance statistics of the nonlinear error values within each subrange;

means for deriving boundary values based on the mean and variance of the nonlinear error values for each subrange; and means for discarding the nonlinear error values that lie outside the boundary values.

83. The apparatus according to claim 71 wherein the means for removing largely deviated nonlinear error values comprises:

means for dividing the nonlinear error values into subranges along the reference magnitude dimension;

means for estimating the histogram and probability density of the nonlinear error values within each subrange;

means for deriving boundary values based on the histogram and probability density of the nonlinear error values for each subrange; and means for discarding the nonlinear error values that lie outside the boundary values.

84. The apparatus according to claim 71 wherein the means for deriving coefficients further comprises means for separating systematic nonlinear error values from random nonlinear error values by applying an optimal curve fitting on the nonlinear error values.

85. The apparatus according to claim 84 further comprising applying a weighting function to the nonlinear error values based on the probability distribution of the magnitude values of the transmitted digitally modulated signal samples.

86. The apparatus according to claim 84 further comprising means for shifting reference magnitude values entering the application of optimal curve fitting by a constant value resulting in a centerized reference magnitude values versus nonlinear error values thereby improving estimation accuracy.

87. A machine readable medium having stored thereon a series of instructions which, when executed by a processor of a measurement receiver, performs in-service nonlinear error measurements on a digitally modulated radio frequency signal generated by a transmission system having a transmitter filter and a receiver filter wherein signal samples are generated representative of the digitally modulated radio frequency signal and filtered signal samples are generated by filtering the signal samples through a transmission system receiver filter, unfiltered signal samples are generated by bypassing the transmission system receiver filter, reference signal samples are generated from estimated transmitted digital symbols of the digital modulation that are time-aligned with the unfiltered signal samples, the instructions causing the processor to:

generate nonlinear error values using the reference signal samples and the unfiltered signal samples;

remove largely deviated nonlinear error values that exceed boundary values in error versus magnitude space;

derive coefficients for a nonlinear behavior function using the nonlinear error values within the boundary values; and estimate nonlinear error values as a function of the reference magnitude values using the derived coefficients in the nonlinear behavior function.

88. The machine readable medium as recited in claim 87 wherein the generating nonlinear error values instructions further comprises instructions, which when executed by the processor calculates magnitude nonlinear error values.

89. The machine readable medium as recited in claim 87 wherein the generating nonlinear error values instructions further comprises instructions, which when executed by the processor calculates phase nonlinear error values.

90. The machine readable medium as recited in claim 88 wherein the calculating magnitude nonlinear error values instructions further comprises instructions, which when executed by the processor:

calculates unfiltered magnitude values from the unfiltered signal samples; and subtracts the reference magnitudes values from corresponding unfiltered magnitude values.

91. The machine readable medium as recited in claim 88 wherein the calculating magnitude nonlinear error values instructions further comprises instructions, which when executed by the processor:

calculates unfiltered magnitude values from the unfiltered signal samples; and calculates magnitude gain values by dividing the unfiltered magnitude values by the corresponding reference magnitudes values.

92. The machine readable medium as recited in claim 89 wherein the calculating phase nonlinear error values instructions further comprises instructions, which when executed by the processor calculates the phase difference between the reference signal samples and the unfiltered signal samples.

93. The machine readable medium as recited in claim 87 wherein the removing largely deviated nonlinear error values instructions further comprises instructions, which when executed by the processor:

divides the nonlinear error values into subranges along the reference magnitude dimension;

estimates mean and variance statistics of the nonlinear error values within each subrange;

derives boundary values based on the mean and variance of the nonlinear error values for each subrange; and discards the nonlinear error values that lie outside the boundary values.

94. The machine readable medium as recited in claim 87 wherein the removing largely deviated nonlinear error values instructions further comprises instructions, which when executed by the processor:

divides the nonlinear error values into subranges along the reference magnitude dimension;

estimates the histogram and probability density of the nonlinear error values within each subrange;

derives boundary values based on the histogram and probability density of the nonlinear error values for each subrange; and discards the nonlinear error values that lie outside the boundary values.

95. The machine readable medium as recited in claim 87 wherein the coefficient deriving instructions further comprises instructions, which when executed by the processor separates systematic nonlinear error values from random nonlinear error values by applying an optimal curve fitting on the nonlinear error values.

96. The machine readable medium as recited in claim 95 further comprises instructions, which when executed by the processor applies a weighting function to the nonlinear error values based on the probability distribution of the magnitude values of the transmitted digitally modulated signal samples.

97. The machine readable medium as recited in claim 95 further comprises instructions, which when executed by the processor shifts reference magnitude values entering the application of optimal curve fitting by a constant value resulting in a centerized reference magnitude values versus nonlinear error values thereby improving estimation accuracy.

* * * * *